(12) United States Patent
Zhao et al.

(10) Patent No.: US 10,327,155 B2
(45) Date of Patent: Jun. 18, 2019

(54) ELECTRONIC APPARATUS AND METHOD IN WIRELESS COMMUNICATION SYSTEM

(71) Applicant: SONY CORPORATION, Tokyo (JP)

(72) Inventors: Youping Zhao, Beijing (CN); Dongzhi Zhu, Beijing (CN); Chen Sun, Beijing (CN); Xin Guo, Beijing (CN)

(73) Assignee: SONY CORPORATION, Tokyo (JP)

( * ) Notice: Subject to any disclaimer, the term of this patent is extended or adjusted under 35 U.S.C. 154(b) by 23 days.

(21) Appl. No.: 15/841,417

(22) Filed: Dec. 14, 2017

(65) Prior Publication Data

US 2018/0262918 A1     Sep. 13, 2018

(30) Foreign Application Priority Data

Mar. 8, 2017   (CN) .......................... 2017 1 0136250

(51) Int. Cl.
*H04W 16/28*     (2009.01)
*H04B 7/0456*    (2017.01)
*H04B 7/06*      (2006.01)
*H04W 4/02*      (2018.01)

(52) U.S. Cl.
CPC .......... *H04W 16/28* (2013.01); *H04B 7/0482* (2013.01); *H04B 7/0695* (2013.01); *H04B 7/0617* (2013.01); *H04W 4/026* (2013.01)

(58) Field of Classification Search
CPC ...... H04W 16/28; H04B 17/318; H01Q 1/246
See application file for complete search history.

(56) References Cited

U.S. PATENT DOCUMENTS

| | | | |
|---|---|---|---|
| 8,619,894 B1 * | 12/2013 | Thomas ................ | H01Q 1/246 375/261 |
| 2016/0182163 A1 * | 6/2016 | Guey ................... | H04B 17/318 455/63.4 |
| 2017/0366242 A1 * | 12/2017 | Lee ....................... | H01Q 1/243 |

* cited by examiner

*Primary Examiner* — Myron Wyche
(74) *Attorney, Agent, or Firm* — Xsensus LLP

(57) ABSTRACT

An electronic apparatus and a method in a wireless communication system are disclosed. The electronic apparatus comprises processing circuitry configured to train a beam adjustment model for adaptive beamforming with training data, so that the beam adjustment model outputs, for any movement path of a user equipment, beam information which enables a beam adjustment time interval meeting a performance requirement of the user equipment to be optimized. According to embodiments of the disclosure, the beam adjustment model is trained by taking the beam adjustment time interval as an optimization target, and adaptive beamforming is performed using the trained beam adjustment model, so that it is possible to significantly reduce system overhead and measurement and processing overhead for beam adjustment, while ensuring communication performance of the user equipment.

18 Claims, 17 Drawing Sheets

ELECTRONIC APPARATUS AND METHOD IN WIRELESS COMMUNICATION SYSTEM

FIELD

The present disclosure relates to the field of wireless communication technology, and in particular to an electronic apparatus and a method in a wireless communication system for implementing an adaptive beamforming scheme aiming at reducing beam adjustment overhead.

BACKGROUND

The existing beamforming technology mainly includes non-codebook beamforming and codebook-based beamforming. In the non-codebook beamforming, it is generally required to acquire accurate channel state information (CSI), and to update beamforming parameters in real timeon both of the two communication parties based on the channel state information. The existing beam adjustment algorithm generally involves high computational complexity such as matrix inversion operations, and therefore involves great system overhead, and measurement and processing overhead. On the other hand, in the codebook-based beamforming, a designed beam pattern is edited as a codebook, and an optimal receiving/transmitting beam weight vector is obtained by performing beam searching in real-time, which may avoid acquisition of the channel state information. Therefore, the codebook-based beamforming is a good choice in a case that the length of the codebook is short. However, as the number of antenna array elements increases, the number of selectable beam patterns increases significantly, and time for beam searching accordingly increases significantly, which results in significant increment in time for link establishment and great time overhead. In a scenario requiring high real-time, the codebook-based beamforming may be unable to meet the performance requirement. Therefore, a problem to be solved currently is how to reduce the system overhead and the measurement and the processing overhead while ensuring the performance of the link.

SUMMARY

A brief summary of the disclosure will be given below to provide basic understanding of some aspects of the disclosure. However, it shall be appreciated that this summary is neither exhaustively descriptive of the disclosure nor intended to define essential or important components or the scope of the disclosure but is merely for the purpose of presenting some concepts of the disclosure in a simplified form and hereby acts as a preamble of more detailed descriptions which will be presented later.

In view of the above described problem, an object of at least one aspect of the present disclosure is to provide an electronic apparatus and a method in a wireless communication system, which are capable of reducing overhead in beam adjustment while ensuring communication performance of a user equipment.

According to an aspect of the present disclosure, an electronic apparatus in a wireless communication system is provided, the electronic apparatus including processing circuitry configured to: train a beam adjustment model for adaptive beamforming with training data, so that the beam adjustment model outputs, for any movement path of a user equipment, beam information which enables a beam adjustment time interval meeting a performance requirement of the user equipment to be optimized.

According to another aspect of the present disclosure, an electronic apparatus in a wireless communication system is further provided, the electronic apparatus including processing circuitry configured to: perform, based on at least information on a position, a movement direction and a communication performance requirement of a user equipment, beam adjustment using the beam adjustment model trained by the electronic apparatus described above, to achieve adaptive beamforming.

According to another aspect of the present disclosure, an electronic apparatus in a wireless communication system is further provided, the electronic apparatus including processing circuitry configured to: generate a report including at least a position, a movement direction and a communication performance requirement of a user equipment, the report being to be transmitted to a serving base station of the user equipment, so that the serving base station performs, based on the received report, beam adjustment using the beam adjustment model trained by the electronic apparatus described above, to achieve adaptive beamforming.

According to another aspect of the present disclosure, a method in a wireless communication system is further provided, the method including: training a beam adjustment model for adaptive beamforming with training data, so that the beam adjustment model outputs, for any movement path of a user equipment, beam information which enables a beam adjustment time interval meeting a performance requirement of the user equipment to be optimized.

According to another aspect of the present disclosure, a method in a wireless communication system is further provided, the method including: performing, based on at least information on a position, a movement direction and a communication performance requirement of a user equipment, beam adjustment using the beam adjustment model trained by the electronic apparatus described above, to realize adaptive beamforming.

According to another aspect of the present disclosure, a method in a wireless communication system is further provided, the method including: generating a report including at least a position, a movement direction and a communication performance requirement of a user equipment, the report being to be transmitted to a serving base station of the user equipment, so that the serving base station performs, based on the received report, beam adjustment using the beam adjustment model trained by the electronic apparatus described above, to achieve adaptive beamforming.

According to other aspects of the present disclosure, it is further provided computer program codes and a computer program product for implementing the above method according to the present disclosure, and a computer readable storage medium on which the computer program codes for implementing the above method according to the present disclosure are recorded.

According to the electronic apparatus and the method in the wireless communication system according to the present disclosure, the beam adjustment model is trained by taking the beam adjustment overhead as an optimization target, and the trained beam adjustment model is used to achieve the adaptive beamforming, and thus it is possible to reduce the system overhead while ensuring system performance.

Other aspects of the embodiments of the disclosure will be presented in the following detailed description serving to fully disclose preferred embodiments of the disclosure but not to limit the disclosure.

BRIEF DESCRIPTION OF THE DRAWINGS

The disclosure can be better understood with reference to the detailed description given below in conjunction with the accompanying drawings, throughout which identical or like reference signs denote identical or like components. The accompanying drawings together with the following detailed description are incorporated into and form a part of the specification and serve to further illustrate the preferred embodiments of the disclosure and to explain the principle and advantages of the disclosure by way of example. In the drawings.

DETAILED DESCRIPTION OF EMBODIMENTS

Figure 1:
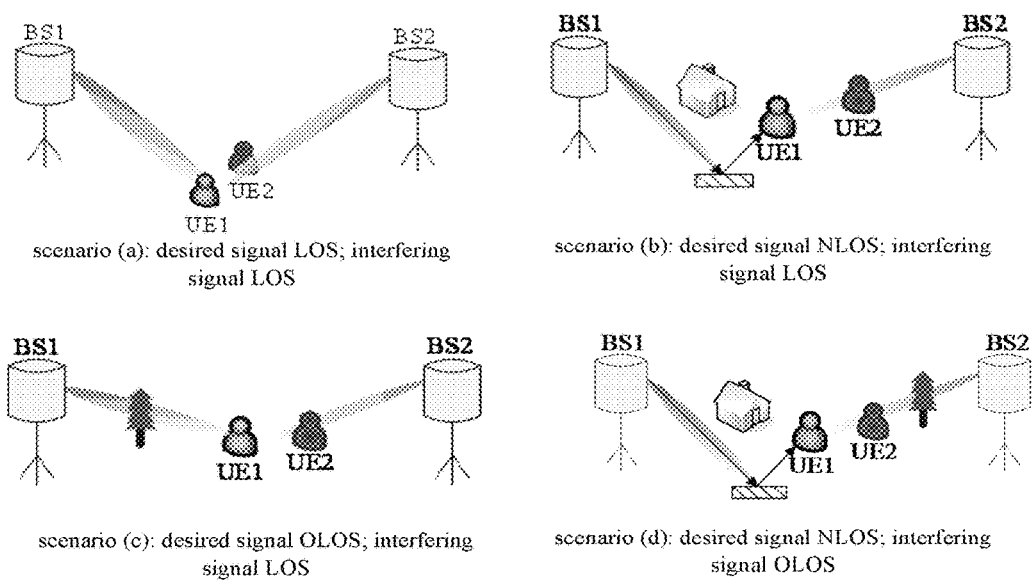
FIG. 1 is a schematic diagram showing an example of an application scenario according to the present disclosure.

Exemplary embodiments of the present disclosure will be described below in conjunction with the accompanying drawings. For the sake of clarity and conciseness, not all the features of practical implementations are described in the specification. However, it is to be appreciated that numerous implementation-specific decisions shall be made during developing any of such practical implementations so as to achieve the developer's specific goals, for example, to comply with system- and business-related constraining conditions which will vary from one implementation to another. Moreover, it shall also be appreciated that such a development effort might be very complex and time-consuming but may simply be a routine task for those skilled in the art benefiting from this disclosure.

It shall further be noted that only those apparatus structures and/or process steps closely relevant to the solutions of the disclosure are illustrated in the drawings while other details less relevant to the disclosure are omitted so as not to obscure the disclosure due to those unnecessary details.

Hereinafter, the embodiments of the present disclosure will be described in detail with reference to FIGS. 1 to 21.

Hereinafter, description will be made in the following order.

1. Exemplary application scenario according to the technology of the present disclosure 2. Electronic apparatus on a base station side in a wireless communication system according to an embodiment of the present disclosure 3. Electronic apparatus on a user equipment side in a wireless communication system according to an embodiment of the present disclosure 4. Information interaction process for implementing a beam adjustment scheme according to the present disclosure 5. Method on a base station side in a wireless communication system according to an embodiment of the present disclosure 6. Method on a user equipment side in a wireless communication system according to an embodiment of the present disclosure 7. Technical effect of the present disclosure and simulation 8. Computing apparatus for implementing an electronic apparatus and a method according to the present disclosure 9. Application example of the technology according to the present disclosure 9-1. Application example regarding base station 9-2. Application example regarding user equipment

1. Exemplary Application Scenario According to the Technology of the Present Disclosure With the growing traffic demand in a wireless communication network, a large number of unused spectrum resources in millimeter-wave band (30~300 GHz) have attracted more and more attention. As a feasible solution for improving network capacity, the large number of unused spectrum resources in the millimeter-wave band can realize a network capacity which is dozens or even hundreds of times of the capacity of the current 4G cellular network. Compared with the low frequency band, the millimeter-wave band has greater path loss and is easier to be blocked, which makes high-gain directional transmission and reception become necessary. In addition, due to a short wavelength of the millimeter wave, multiple antennas are allowed to be mounted in a small physical space, so that it is possible to perform beamforming using the millimeter wave in conjunction with a multi-antenna array to obtain a high gain.

In order to reduce the number of radio frequency links and reduce energy consumption and hardware complexity, the beamforming technology in the millimeter-wave band usually functions in an analog domain, and controls a radiation pattern of a transmitting/receiving beam by adjusting a phase of each antenna array element. However, since the millimeter wave has characteristics such as a narrow beam, a short propagation link and being prone to be blocked, communication in the millimeter-wave band is prone to be affected by the surrounding environment during the movement, which results in a fast change of a channel. Further, due to using of the multi-antenna technology, the number of antenna arrays is great, and the number of selectable beam patterns and the time for beam searching also significantly increase. Therefore, a problem to be solved in the beamforming technology in the millimeter-wave band is how to reduce great system overhead and measurement and processing overhead caused by the real-time beamforming adjustment.

Here, it should be noted that in the embodiments of the present disclosure, the beamforming scheme according to the present disclosure is described by taking the beamforming technology in the millimeter-wave band as an example, this is because the problem of great system overhead in the conventional adaptive beamforming scheme caused by the above-described characteristics (a fast-varying channel condition, a large number of antenna arrays and the like) of the millimeter-wave band is particularly prominent. It should be understood, however, that the present disclosure is not limited thereto, and may be similarly applied to any communication scenario in which an optimization target is to reduce the system overhead in adaptive beamforming.

FIG. 1 is a schematic diagram showing an exemplary application scenario according to the technology of the present disclosure.

In a small cell network, beamforming is usually performed using a millimeter wave in conjunction with multi-antenna technology. FIG. 1 shows four exemplary application scenarios (a) to (d) that may exist in the small cell network.

In the scenarios (a) to (d) shown in FIG. 1, UE1 represents a target user equipment, UE2 represents an interfering user equipment, BS1 and BS2 respectively represent serving base stations of the UE1 and the UE2, a signal of the UE1 is a desired signal, and a signal of the UE2 is an interfering signal. In general, a radio channel condition of a signal can include: Line of Sight (LOS), None Line of Sight (NLOS) and Obstructed Line of Sight (OLOS). There is no obstruction between a transmitter and a receiver under the LOS condition, there is a strong obstruction such as a building between a transmitter and a receiver under the NLOS condition, and there is a weak obstruction such as a tree between a transmitter and a receiver under the OLOS condition.

The scenario (a) shown in FIG. 1 indicates that both the desired signal and the interfering signal are under the LOS condition, that is, there is no obstruction between BS1 and UE1 and between BS2 and UE2. The scenario (b) indicates that the desired signal is under the NLOS condition while the interfering signal is under the LOS condition, that is, there is e.g. a building between BS1 and UE1, and there is no obstruction between BS2 and UE2. The scenario (c) indicates that the desired signal is under the OLOS condition while the interfering signal is under the LOS condition, that is, there is e.g. a tree between BS1 and UE1, and there is no obstruction between BS2 and UE2. The scenario (d) indicates that the desired signal is under the NLOS condition while the interfering signal is under the OLOS condition, that is, there is e.g. a building between BS1 and UE1, and there is e.g. a tree between BS2 and UE2.

It should be understood that the exemplary scenarios shown in FIG. 1 are merely examples of the application scenario that may exist in the communication in the millimeter-wave band in the small cell network, and the application scenario of the present disclosure is obviously not limited thereto. Those skilled in the art can similarly apply, according to the principle of the present disclosure, the technology of the present disclosure to any communication scenario, in which a signal of the target user equipment suffers from interference as the target user equipment moves, resulting in a degradation in communication quality such that the performance requirement of the user equipment (e.g., a signal to interference plus noise ratio (SINR), throughput, an outage probability or the like) cannot be met and thereby beam adjustment is required to improve communication quality.

2. Electronic Apparatus on a Base Station Side in a Wireless Communication System According to an Embodiment of the Present Disclosure FIG. 2 is a block diagram showing an example of a functional configuration of an electronic apparatus on a base station side in a wireless communication system according to an embodiment of the present disclosure.

Figure 2:
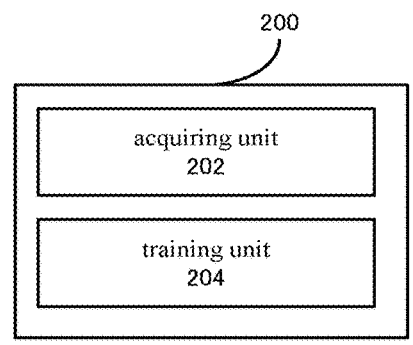
FIG. 2 is a block diagram showing an example of a functional configuration of an electronic apparatus on a base station side in a wireless communication system according to an embodiment of the present disclosure.

As shown in FIG. 2, an electronic apparatus 200 according to the embodiment may include an acquiring unit 202 and a training unit 204.

The acquiring unit 202 may be configured to acquire training data. In the embodiment of the present disclosure, an input parameter input to a beam adjustment model include at least training paths including different initial positions and movement directions of a user equipment, and an output parameter of the beam adjustment model is beam information which enables a beam adjustment time interval meeting a performance requirement of the user equipment to be optimized. The input parameter and the output parameter together constitute the training data for the beam adjustment model.

Preferably, the beam adjustment model may be implemented based on a neural network or a classifier.

In recent years, the neural network and other machine learning algorithm for implementing multi-classification have attracted widespread concerns of researchers due to advantages thereof such as strong non-linear fitting ability, a massive parallel computing ability, adaptive learning ability, fast convergence ability, complex data classification ability and the like. The application of the neural network and/or a multi-classifier to beamforming can solve problems of complex computation and a real-time requirement. The existing beamforming algorithm based on the neural network and/or the multi-classifier are usually implemented based on the existing adaptive beamforming algorithm (such as Least Mean Square (LMS), Minimum Variance Distortionless Response (MVDR) or the like), which enhances a signal in a desired direction and attenuates an interfering signal in other directions, without consideration in taking the beam adjustment overhead as an optimization target.

The neural network may be configured as, for example, a beamforming weight vector classification network, and/or the classifier may be configured as a Naive Bayes classifier, a Support Vector Machine (SVM) classifier and the like. It should be noted that examples of the neural network and the classifier given herein are merely illustrative, and those skilled in the art can also utilize any neural network and/or classifier, which can achieve adaptive beamforming, for implementing the technical solution of the present disclosure, which is not limited in the present disclosure, and all of such variations are regarded to fall within the scope of the present disclosure.

Figure 3:
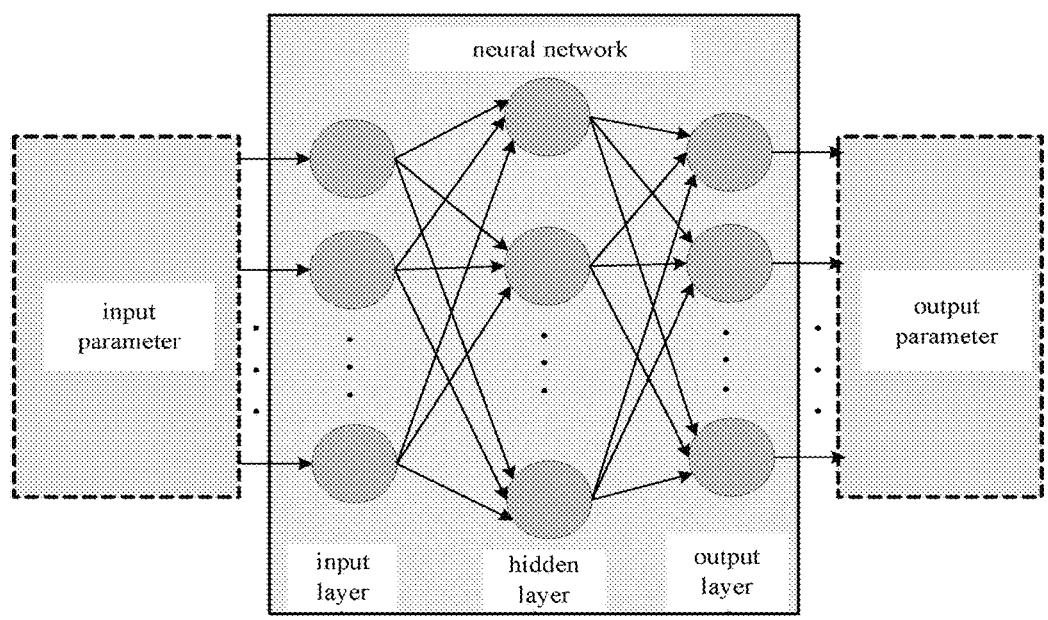
FIG. 3 is a schematic diagram showing an example of a structure of a neural network.

Hereinafter, as an example, an example of a structure of a neural network will be briefly described with reference to FIG. 3. FIG. 3 is a schematic diagram showing an example of a structure of a neural network.

As shown in FIG. 3, a neural network may include an input layer, one or more hidden layers and an output layer. A type and a structure of the adopted neural network are not specifically limited in the present disclosure, and any neural network that can achieve the multi-classification can be adopted. As a preferred example, the neural network may be a radial basis function neural network (RBFNN).

The classifier for implementing the technical solution according to the present disclosure has substantially the same structure as that of the existing classifier (e.g., a Naive Bayes classifier, a Support Vector Machine classifier or the like) for achieving multi-classification, and will not be described in detail here.

In addition, it should be noted that although the implementation of the beam adjustment model is described by taking the neural network or the classifier as an example, the beam adjustment model may also be implemented based on other existing learning algorithms or learning algorithms that may appear in the future, as long as the trained beamforming adjustment model can reduce the beam adjustment overhead.

The beam adjustment time interval herein refers to a time interval for which beam adjustment is required to be performed so that the adjusted beam enables communication performance of a user equipment to meet a performance requirement thereof, in a case that the communication performance of the user equipment cannot meet the performance requirement during movement of the user equipment.

Preferably, the performance requirement may include, for example, one or more of a signal to interference plus noise ratio (SINR), a throughput and an outage probability, and may further include any estimable and measurable performance indexes in addition thereto. In the following description, SINR is taken as an example of the performance index of the user equipment, but it should be understood that the present disclosure is not limited thereto, and may be similarly applied to any other estimable and measurable performance indexes, such as the throughput and the outage probability and the like.

The training data may be determined in advance outside the electronic apparatus 200, and in this case, the acquiring unit 202 may directly acquire the training data from, for example, an external database. Alternatively, the training data may be also generated by the electronic apparatus 200. As an example, an exemplary way of generating the training data by the acquiring unit 202 of the electronic apparatus 200 is described below in detail with reference to FIG. 4.

Figure 4:
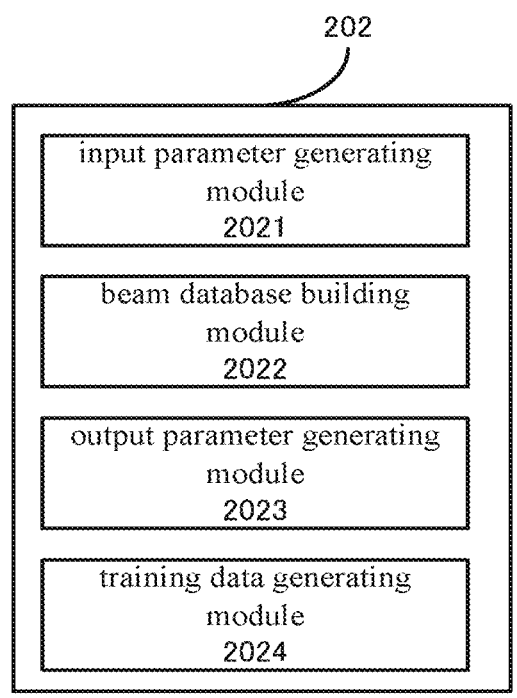
FIG. 4 is a block diagram showing an example of a specific functional configuration of an acquiring unit in the electronic apparatus according to an embodiment of the present disclosure.

FIG. 4 is a block diagram showing an example of a specific functional configuration of an acquiring unit in the electronic apparatus according to an embodiment of the present disclosure.

As shown in FIG. 4, the acquiring unit 202 may include an input parameter generating module 2021, a beam database building module 2022, an output parameter generating module 2023, and a training data generating module 2024.

The input parameter generating module 2021 may be configured to generate training paths including different initial positions and movement directions of a user equipment within a coverage area of a serving cell of the user equipment as an input parameter of the beam adjustment model.

Specifically, the training paths may be obtained based on different initial positions of the user equipment, and one or more next movement positions of the user equipment which are predicted based on the initial positions and the movement directions using a random model. Preferably, for example, the input parameter generating module 2021 may generate the training paths in one or more of an equal-interval sampling manner and a random walking manner.

In the equal-interval sampling manner, an azimuth angle of a position where the user equipment is located, a distance from a base station, a possible movement direction and the like within the coverage area of the serving cell may be sampled at an equal interval, and each sampled position and possible movement direction are combined to obtain a training path. A specific value of the interval may be set as needed, which is not limited in the present disclosure.

In the random walking manner, an initial position and an ending position may be set randomly within the coverage area of the serving cell, and a movement path along which the user equipment moves from the initial position to the ending position at a certain speed is set as a training path. Sufficient training paths within the coverage area of the serving cell can be obtained by repeating the above operation.

Preferably, the input parameter also includes environmental information (e.g., street information or the like), and the input parameter generating module 2021 may also generate the training paths based on the information on the environment where the user equipment locates. Since the environmental information (e.g., street information or the like) limits a possible movement path of the user equipment to a certain extent, more practical training paths may be generated by considering the environmental information, thereby improving output accuracy of the beam adjustment model trained with the training paths.

In addition, preferably, the input parameter of the beam adjustment model may further include interference information for the user equipment, e.g., a direction and a width of an interfering beam, and the input parameter generating module 2021 may also generate the training paths based on the interference information.

Figure 5:
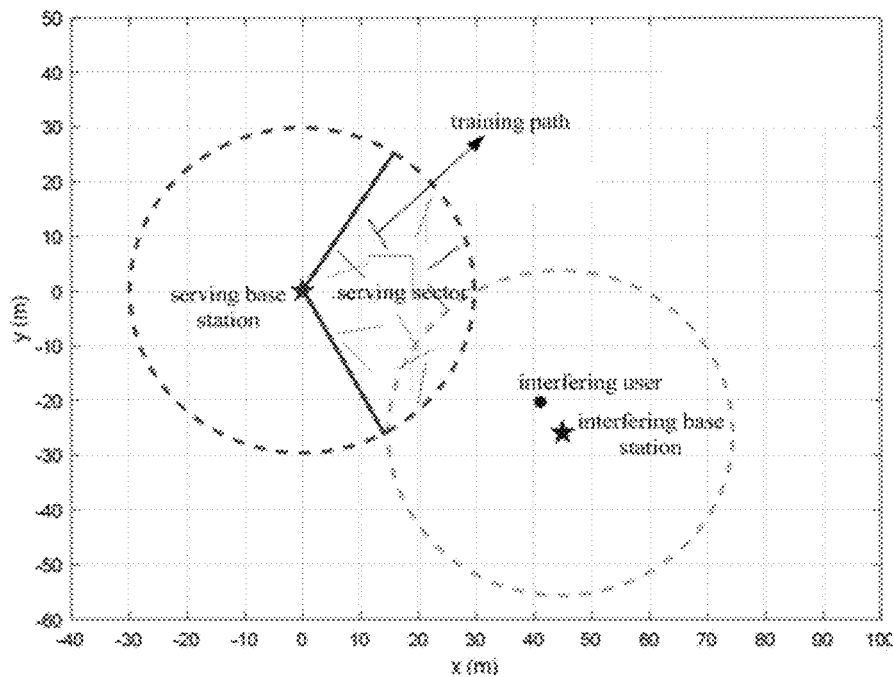
FIG. 5 is a schematic diagram showing a simulation example of training path generation according to an embodiment of the present disclosure.

FIG. 5 is a schematic diagram showing a simulation example of training path generation according to an embodiment of the present disclosure. In the example shown in FIG. 5, the training paths are generated in the equal-interval sampling manner for example.

In the example shown in FIG. 5, it is assumed that a radius of a cell of a serving base station is 30 m, a signal of a target user equipment, i.e., a desired signal, is under the LOS condition, and a signal of a user equipment of an interfering base station, i.e., an interfering signal, is also under the LOS condition, the width of an interfering beam is 4°, an angle between the interfering beam and the x-axis shown in FIG. 5 is 125°, and an area covered by a serving sector ranges from an angle of −60° to an angle of +60° with respect to an positive direction of the x-axis shown in FIG. 5. An initial adjustment position for training is selected at an angle interval of 1°, a distance interval at the same angle is 1 m, a movement direction for the training is sampled every 20° in a direction from 0° to 360°, so that each position and each possible movement direction are combined as a training path. Multiple short line segments within the serving sector shown in FIG. 5 indicate the training paths of the serving sector of the serving base station generated by simulation in the exemplary application scenario.

It should be understood that the manner of generating the training paths described above is only exemplary rather than restrictive, and those skilled in the art may generate the training paths with any other manners, as long as abundant training paths are generated to cover movement paths within the serving cell as much as possible.

Referring back to FIG. 4, the beam database building module 2022 may be configured to build a beam database in a codebook-based beamforming manner or an iteration-based non-codebook beamforming manner.

Preferably, in the case of building the beam database in the codebook-based beamforming manner, it is necessary to ensure that the selected codebook covers at least all beams within the coverage area of the serving cell, and in the case of building the beam database in the iteration-based non-codebook beamforming manner, it is necessary to ensure for any training path, at least a beam which enables a beam adjustment time interval meeting a performance requirement of the user equipment to be optimized can be found in the built beam database.

An exemplary manner of building a beam database will be described below by taking the codebook-based beamforming manner as an example. A commonly used codebook may include a beamsteering codebook, a phase shift-specific codebook and the like. The beamsteering codebook generates a beam based on a beam control vector which quantifies an angle of arrival (AOA), and different beams point to different directions. Each codeword in the phase shift-specific codebook corresponds to a designed beam pattern, and each element in the codeword is selected from a set of phases for designing the codebook. The set of phases is a set of multiple phases from 0 to $2\pi$ or from $-\pi$ to $\pi$, for example, a specific four-phase shifter $\{0, \pi/2, \pi, 3\pi/2\}$, which phase respectively correspond to weighting factors of $\{1, j, -1, -j\}$.

Taking the beamsteering codebook as an example, it is assumed that a uniform linear antenna array is adopted, the number of antenna array elements is M, a sector covered by the serving base station ranges from an angle of $-\Phi/2$ to an angle of $+\Phi/2$, the number of codewords included in the codebook is L, an interval between main beams generated by adjacent codewords is $\Phi/(L-1)$, and a direction of a main lobe of a beam generated by an l-th (l=0, 1, . . . , L−1) codeword is $\varphi_l = -\Phi/2 + \Phi l/(L-1)$, then the l-th codeword $w_l$ in the codebook can be expressed as the following equation (1):

$$w_l = W(:, l) = \left[1, e^{j\frac{2\pi}{\lambda}d\sin\varphi_l}, \ldots, e^{j\frac{2\pi}{\lambda}(M-1)d\sin\varphi_l}\right]^T \quad (1)$$

where $\lambda$ represents a wavelength of a millimeter wave, d represents a distance between two antenna array elements, W represents a codebook matrix of M×L, and $O^T$ represents a transpose operator.

Figure 6:
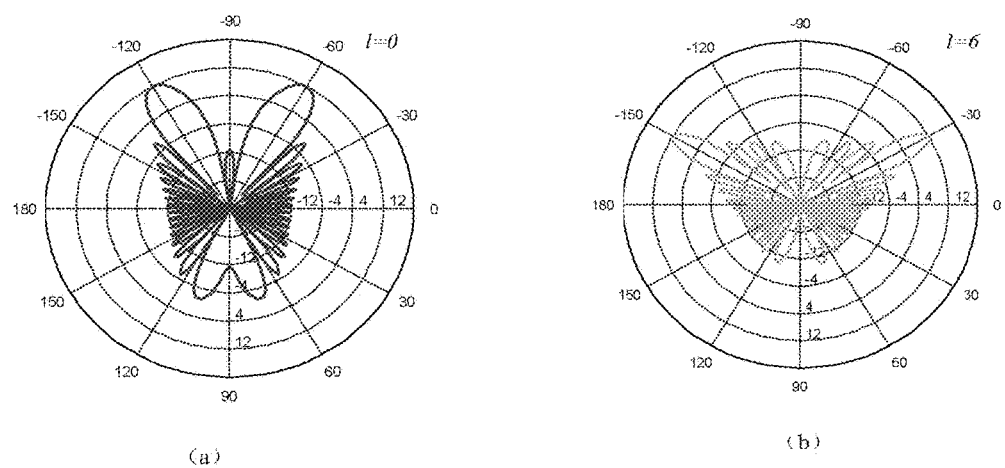
FIG. 6 is a schematic diagram showing an example of an array gain pattern of a part of beams according to an embodiment of the present disclosure.

As an example, FIG. 6 shows an array gain pattern of a part of beams obtained in the manner described above. (a) in FIG. 6 shows an array gain pattern (also referred to as a beam pattern) in a case of a codeword index (also referred to as a beam index) l=0, and (b) in FIG. 6 shows an array gain pattern in a case of a codeword index l=6.

It should be understood that although description is made in a case that the beam database is built with the beamsteering codebook by way of example here, the present disclosure is not limited thereto, and alternatively, the beam database may be built with other codebook or in a non-codebook manner. How to specifically build a beam database is not limited in the present disclosure, as long as the built beam database can meet the above requirements.

Referring back to FIG. 4, the output parameter generating module 2023 may be configured to search, for the input parameter, the built beam database for beam information which enables a beam adjustment time interval meeting a performance requirement of the user equipment to be optimized as an output parameter of the beam adjustment model.

Specifically, it is assumed that the number of the base stations is K, the number of users in each of the base stations is N. For the n-th user equipment of the k-th base station, in order that a selected beam can meet the performance requirement of the user equipment at as many positions as possible in the future so as to reduce the number of times of beam adjustment, for the input parameter including a position and a movement direction of the user equipment (i.e., the training path), a direction and a width of an interfering beam and the like generated by the input parameter generating module 2021, the built beam database is exhaustively searched for all possible beams so as to find the beam information meeting the following formula (2), that is, the beam information which can maximize the beam adjustment time interval while meeting a service quality requirement (e.g., an SINR requirement) of the user equipment. In the case where the beam database is built in a codebook-based beamforming manner, the beam information may be a beamforming weight vector index which enables a beam adjustment time interval meeting the performance requirement of the target user equipment (assumed as the n-th user equipment of the k-th base station here) to be optimized. Alternatively, the beam information may also be any indication information indicating the determined beam.

$$\max_{w} \Delta T_{kn} \quad (2)$$

$$\text{s.t.} \begin{cases} SINR_{k,n} \geq SINR_{k,n}^{th} \\ P_t \leq P_t^{max} \end{cases}$$

where ΔT represents the beam adjustment time interval for evaluating the system overhead and the measurement and processing overhead, and is defined as a time interval between two times of beam adjustment, which can meet the performance requirement (e.g., SINR requirement) of the target user equipment; $\Delta T_{kn}$ represents a beam adjustment interval of the n-th user equipment of the k-th base station; w represents the beamforming weight vector; $SINR_{k,n}$ is an SINR of the n-th user equipment of the k-th base station; $SINR_{k,n}^{th}$ is an SINR threshold of the n-th user equipment of the k-th base station; and $P_t$ is a total transmission power of the base station, and $P_t^{max}$ is a maximum total transmission power of the base station (assumed the total transmission power and the maximum total transmission power of respective base stations are the same). Under a multi-cell multi-user network condition, $SINR_{k,n}$ may be expressed as, for example, the following equation (3):

$$SINR_{k,n} = \frac{P_{kn} h_{k,k_n}^H w_{k_n} w_{k_n}^H h_{k,k_n}}{\sum_{i=1, i\neq n}^{N} P_{ki} h_{k,k_n}^H w_{k_i} w_{k_i}^H h_{k,k_n} + \sum_{b=1,b\neq k}^{K} \sum_{j=1}^{N} P_{bj} h_{b,k_n}^H w_{b_j} w_{b_j}^H h_{b,k_n} + \sigma_{kn}^2} \quad (3)$$

where $P_{kn}$ is a transmission power allocated to the n-th user equipment by the k-th base station, $P_{bj}$ is a transmission power allocated to the j-th user equipment by the b-th base station, $h_{b, kn}$ is a channel matrix from the b-th base station to the n-th user equipment of the k-th base station, and $w_{bj}$ represents a beamforming weight vector of the j-th user equipment in the b-th base station from the b-th base station. The numerator on the right side of the equation (3) represents a power of a useful signal received by the n-th user equipment of the k-th base station, the first term in the denominator represents interference received by the n-th user equipment of the k-th base station from other user equipment in the same cell, the second term in the denominator represents interference received by the n-th user equipment of the k-th base station from user equipment in other cells, and the third term in the denominator, that is, $\sigma_{kn}^2$, represents a noise power received by the n-th user equipment of the k-th base station.

Accordingly, according to the above-described equations (2) and (3), beam information that maximizes the beam adjustment time interval meeting the SINR requirement of the target user equipment can be obtained.

It should be understood that although an exemplary manner for determining beam information with a maximum beam adjustment time interval is described above with reference to the equations (2) and (3), this is merely exemplary rather than restrictive, and those skilled in the art may also make appropriate modifications to the above-described manner in conjunction with actual requirements (e.g., technical level, other aspects and the like) in accordance with the principle of the present disclosure. For example, the beam adjustment time interval is not necessarily the maximum beam adjustment time interval, and may be, for example, greater than a predetermined threshold. For example, the parameter for evaluating the communication performance of the user equipment is not necessarily the SINR, and may be an outage probability, throughput and the like, which is not specifically limited in the present disclosure, as long as the beam determined in the corresponding manner can meet the performance requirement of the user equipment at as many positions as possible in the future to thereby reduce the system overhead due to frequent beam adjustment.

The training data generating module 2024 may be configured to obtain training data for the beam adjustment model based on the generated input parameter and the generated output parameter. Table 1 below shows an example of a part of the training data used in the simulation process described above with reference to FIG. 5.

TABLE 1

Example of training data

| Distance (m) between target user equipment and serving base station | Angle (rad) of target user equipment | Movement direction (rad) of target user equipment | Beamforming weight vector index having maximum beam adjustment time interval |
|---|---|---|---|
| 3 | 5.428 | 0.698 | 4 |
| 6 | 0.401 | 6.109 | 13 |
| 8 | 5.934 | 0.349 | 9 |
| 11 | 1.0297 | 4.887 | 1 |
| 13 | 0.332 | 5.062 | 3 |
| 15 | 5.917 | 1.047 | 7 |
| 18 | 0.681 | 0.175 | 5 |
| 20 | 0.367 | 2.094 | 2 |
| 23 | 0.471 | 1.745 | 8 |
| 25 | 0.122 | 3.840 | 12 |
| 27 | 6.161 | 1.396 | 14 |
| 30 | 0.332 | 4.538 | 13 |

Referring back to FIG. 2, the training unit 204 may be configured to train a beam adjustment model for adaptive beamforming with the training data acquired by the acquiring unit 202 (e.g., acquired from the outside, or generated by the acquiring unit 202 as described above with reference to FIGS. 4 to 6), so that the beam adjustment model outputs, for any movement path of the user equipment, beam information which enables a beam adjustment time interval meeting the performance requirement of the user equipment to be optimized.

Based on the used training data, the beam information outputted by the beam adjustment model is beam information which enables a beam adjustment time interval meeting the performance requirement of the user equipment to be optimized to different degrees. Preferably, in the case where for example the beam information having the maximum beam adjustment time interval described above is taken as the training data, the beam information outputted by the beam adjustment model obtained through the training is beam information which enables the beam adjustment time interval meeting the performance requirement of the user equipment to be maximized for any movement path. In this way, the system overhead caused by beamforming adjustment can be reduced to a relatively great extent by maximizing the beam adjustment time interval.

However, it should be understood that the maximization of the beam adjustment time interval is only a preferred example rather than restrictive, and a specific optimization target may be appropriately set by those skilled in the art based on the actual condition under which the present disclosure is implemented, which is not limited in the present disclosure.

Specifically, the training unit 204 is configured to train the beam adjustment model by taking the training paths constituted by the positions and the movement directions of the user equipment (for example, parameters such as the distance from the serving base station, the angle, the movement direction and the like of the target user equipment as shown in the above Table 1 and the like), and preferably the interference information (such as the direction and the width of the interfering beam), the environmental information (such as the street information) and the like as the input parameter of the beam adjustment model, and taking the beam information having an optimized (preferably, maximum) beam adjustment time interval and corresponding to each group of input parameters (for example, the beamforming weight vector index having the maximum beam adjustment time interval generated by the output parameter generating module 2023 described above) as the output parameter of the beam adjustment model.

The beam adjustment model trained with the training data obtained in for example the manner described above can output beam information which enables a beam adjustment time interval meeting the performance requirement of the user equipment to be optimized (preferably, maximized) in a case where the current position and the movement direction of the user equipment, and optionally the interference information (such as the direction and the width of the interfering beam) and the environmental information (such as the street information) are given, thereby greatly reducing the number of times of beam adjustment as required during movement of the user equipment, and reducing the system overhead, and the measurement and processing overhead and the like.

It should be noted that the various functional units and modules described above with reference to FIGS. 2 and 4 are merely logical modules divided according to the specific functions thereof, and are not intended to limit the specific implementations. In the actual implementation, the above functional units and modules may be implemented as separated physical entities, or may be implemented as a single entity (e.g., a processor (CPU, DSP or the like), an integrated circuit or the like).

A process of training the beam adjustment model for adaptive beamforming is described above. An application in which the trained beam adjustment model is used to perform adaptive beamforming is described below.

Figure 7:
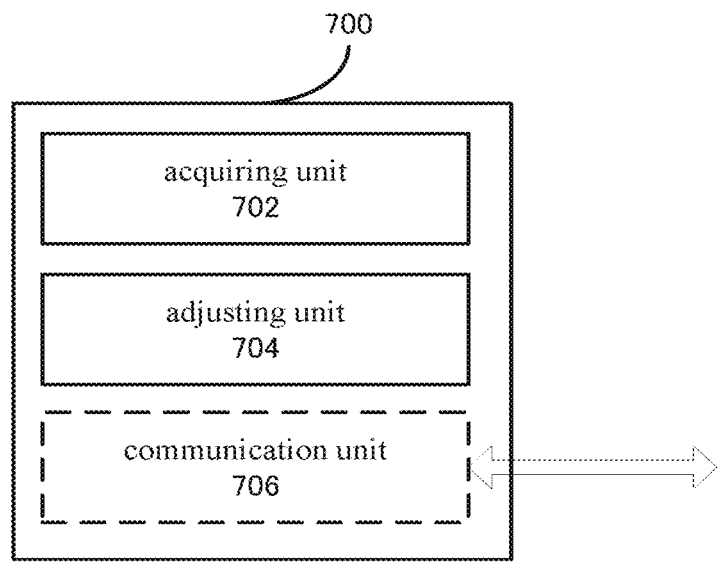
FIG. 7 is a block diagram showing an example of a functional configuration of an electronic apparatus in a wireless communication system according to an embodiment of the present disclosure.

FIG. 7 is a block diagram showing an example of a functional configuration of an electronic apparatus in a wireless communication system according to an embodiment of the present disclosure.

As shown in FIG. 7, an electronic apparatus 700 according to the embodiment may include an acquiring unit 702 and an adjusting unit 704.

The acquiring unit 702 may be configured to acquire at least information on a position, a movement direction and a communication performance requirement of the user equipment.

The adjusting unit 704 may be configured to perform, based on the information acquired by the acquiring unit 702, beam adjustment using the beam adjustment model obtained through the training described above, to achieve adaptive beamforming.

Preferably, the acquiring unit 702 may further acquire one or more pieces of environmental information (e.g., street information or the like) and interference information (e.g., a direction and the width of an interfering beam or the like), and the adjusting unit 704 may further perform the beam adjustment according to one or more pieces of the information.

In particularly, the adjusting unit 704 may input the collected parameters related to the user equipment (including the position, the movement direction and the communication performance requirement of the user equipment and the like), system parameters (including an operating frequency, a maximum transmission power, a cell radius, and interference information of the serving base station and the like), environmental parameters (e.g., street information, building information and the like) and the like to the trained beam adjustment model described above, and the beam adjustment model may output corresponding beam information, then the adjusting unit 704 may perform beam adjustment based on the beam information output from the beam adjustment model to achieve adaptive beamforming.

Figure 8:
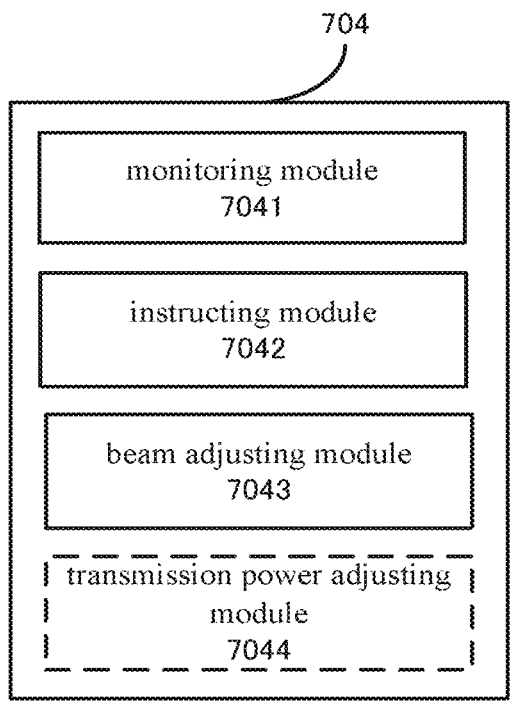
FIG. 8 is a block diagram showing an example of a specific functional configuration of an adjusting unit in the electronic apparatus according to an embodiment of the present disclosure.

Preferably, a trigger event that the electronic apparatus 700 is triggered to perform the beam adjustment may include a case where the communication performance of the target user apparatus does not the performance requirement thereof, thereby realizing real-time adaptive beamforming. The beam adjustment process is further described below in detail with reference to FIG. 8. FIG. 8 is a block diagram showing an example of a specific functional configuration of the adjusting unit 704.

As shown in FIG. 8, the adjusting unit 704 may include a monitoring module 7041, an instructing module 7042, and a beam adjusting module 7043.

The monitoring module 7041 may be configured to monitor the communication performance of the user equipment, for example, one or more of an SINR, an outage probability, throughput of the user equipment.

The instructing module 7042 may be configured to instruct the user equipment to report a current location and a movement direction thereof, in a case where the monitoring module 7041 monitors that the communication performance of the user equipment does not meet the performance requirement thereof.

The beam adjusting module 7043 may be configured to perform, based on the current location and the movement direction reported by the user equipment, beam adjustment using the beam adjustment model obtained through the training to achieve real-time adaptive beamforming.

Preferably, the instructing module 7042 may be configured to directly or indirectly instruct the interfering base station to report interference information in the case where the monitoring module 7041 monitors that the communication performance of the user equipment does not meet the performance requirement thereof, thus the beam adjusting module 7043 may further perform beam adjustment based on the current interference information.

In addition, preferably, the beam adjusting module 7043 may also perform beam adjustment based on system information such as the operating frequency and the maximum transmission power and the like of the serving base station. The system information may come from a core network or a spectrum coordinator, which stores parameter information about each base station in the network, including but not limited to the operating frequency, the maximum transmission power and the like.

It should be noted that how to specifically determine the beam information suitable for the user equipment currently based on the information on the user equipment, the interference information, the system information and the like is implemented by the beam adjustment model. The beam adjustment model can provide, based on these input parameters, beam information which is suitable for a current condition and has optimized (preferably, maximum) beam adjustment time interval rapidly and intelligently, and the beam adjusting module 7043 only needs to perform beam adjustment based on the beam information output by the beam adjustment model without performing complex computation, thereby greatly improving the efficiency of the beam adjustment operation.

Preferably, the adjusting unit 704 may further include a transmission power adjusting module 7044. The transmission power adjusting module 7044 may be configured to adjust transmission power of the serving base station based on the monitored communication performance of the user equipment. The transmission power adjusting module 7044 is optional here and is denoted by a dashed block in FIG. 8.

As an exemplary manner, in a case that it is monitored the communication performance of the user equipment is degraded, the transmission power adjusting module 7044 may preferentially adjust the transmission power of the serving base station to improve the communication performance of the user equipment to meet the performance requirement of the user equipment. If the performance requirement of the user equipment cannot be met by adjusting the transmitting power, then the beam adjusting module 7043 performs the beam adjustment operation. Thus, it is possible to further reduce the system overhead, and the measurement and processing overhead caused by the beam adjustment.

On the other hand, after the beam adjusting module 7043 performs the beam adjustment operation, the transmission power adjusting module 7044 can also adjust the transmission power of the serving base station based on the adjusted beam, the communication performance of the user equipment and the like, to further improve the communication performance and/or reduce interference on a surrounding user equipment.

Referring back to FIG. 7, it should be noted that the electronic apparatus 700 herein may be implemented at a chip level, or may be implemented at an apparatus level by including other peripheral components. For example, the electronic apparatus 700 may operate as a serving base station as a complete machine, and include a communication unit 706 (optionally, denoted by a dashed block) configured to perform data transceiving operations with an external apparatus (e.g., a user equipment, other base station, a core network, a spectrum coordinator or the like). It should be noted that the specific implementation of the communication unit 706 is not limited herein, and the communication unit 706 may include one or more communication interfaces for performing communication with user equipment, with base stations, with the core network or the spectrum coordinator and the like.

Also, it should be noted that the various functional units and modules described with reference to FIGS. 7 and 8 are merely logical modules divided according to specific functions thereof, and are not intended to limit the specific implementation. In the actual implementation, the above functional units and modules may be implemented as separated physical entities, or may be implemented as a single entity (e.g., a processor (a CPU, a DSP or the like), an integrated circuit or the like).

According to the above-described embodiments of the present disclosure, the real-time beam adjustment is performed using the beam adjustment model obtained through the training based on the communication performance of the user equipment, thus it is possible to reduce the beam adjustment overhead as much as possible while ensuring the communication performance of the user equipment. In addition, the beam adjustment model can quickly output the beam information meeting the requirement based on the parameters from various sources, thus it is possible to further reduce the real-time measurement and processing overhead and realize the fast beam adjustment, greatly improving a system response speed and user experience.

Corresponding to the above-described embodiment on the base station side, an embodiment on a user equipment side is further provided below in the present disclosure.

3. Electronic Apparatus on a User Equipment Side According to an Embodiment of the Present Disclosure FIG. 9 is a block diagram showing an example of a functional configuration of an electronic apparatus on a user equipment side according to an embodiment of the present disclosure.

Figure 9:
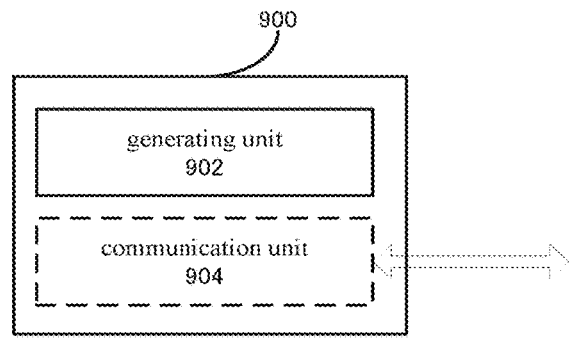
FIG. 9 is a block diagram showing an example of a functional configuration of an electronic apparatus on a user equipment side according to an embodiment of the present disclosure.

As shown in FIG. 9, an electronic apparatus 900 according to the embodiment may include a generating unit 902.

The generating unit 902 may be configured to generate a report including at least a position, a movement direction, and a communication performance requirement of a user equipment, the report being to be transmitted to a serving base station of the user equipment, so that the serving base station may perform, based on the received report, beam adjustment using the trained beam adjustment model described above, to achieve adaptive beamforming.

Preferably, the generating unit 902 may be further configured to generate a report including a current position and a movement direction of the user equipment based on an instruction sent by the serving base station in a case where the communication performance of the user equipment does not meet the communication performance requirement, the report being to be transmitted to the serving base station to achieve real-time adaptive beamforming.

It should be noted that the electronic apparatus 900 herein may be implemented at a chip level, or may be implemented at an apparatus level by including other peripheral components. For example, the electronic apparatus 900 may operate as a user equipment as a complete machine, and include a communication unit 904 (optionally, denoted by a dashed block) for performing data transceiving operations with an external apparatus (e.g., other user equipment, a serving base station and the like). It should be noted that the specific implementation of the communication unit 904 is not limited here, and the communication unit 904 may include one or more communication interfaces for performing communication with user equipment, with the serving base station and the like.

In addition, it should be noted that although the apparatus embodiments of the present disclosure have been described above with reference to functional block diagrams shown in FIGS. 2, 3 and 7 to 9, these are exemplary rather than restrictive. Those skilled in the art may modify the shown examples of the functional configurations according to the principle of the present disclosure. For example, functional modules in various embodiments may be added, deleted, modified, combined or the like, and all of such modifications are considered to fall within the scope of the present disclosure.

In order to facilitate better understanding of an operation process of the technology of the present disclosure, an information interaction process for implementing the beam adjustment scheme according to the embodiment of the present disclosure is described below with reference to FIGS. 10A to 10C in conjunction with the examples of the functional configurations on the base station side and the user equipment side described above.

4. Information Interaction Process for Implementing a Beam Adjustment Scheme According to the Present Disclosure FIG. 10A is a flowchart showing an example of an information interaction process for implementing an adaptive beamforming scheme according to an embodiment of the present disclosure.

Figure 10A:
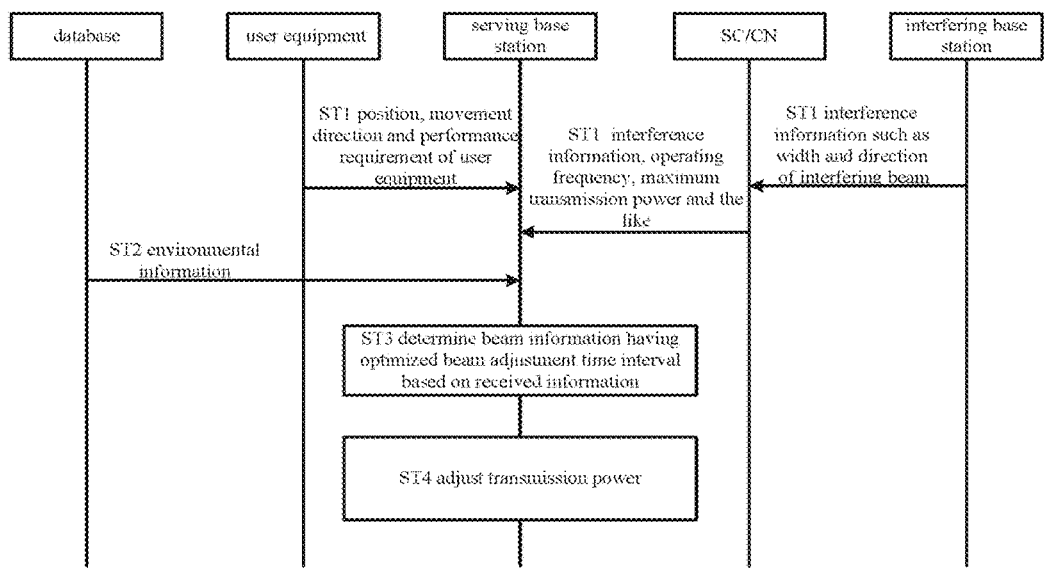
FIG. 10A to FIG. 10C are flowcharts each showing an example of an information interaction process for implementing an adaptive beamforming scheme according to an embodiment of the present disclosure.

As shown in FIG. 10A, first, in step ST1, a user equipment reports a current position, a movement direction, a performance requirement (e.g., an SINR threshold) and the like to a serving base station, an interfering base station reports interference information such as a width and a direction of an interfering beam to a core network CN or a spectrum coordinator SC, and the core network CN or the spectrum coordinator SC transmits the received interference information and system relevant information (e.g., an operating frequency and a maximum transmission power of the serving base station and the like) to the serving base station.

Then, in step ST2, the serving base station may obtain current environmental information (e.g., street information, building information and the like) from a database based on the current position of the user equipment. Next, in step ST3, the serving base station may input the received information on the user equipment, interference information, system information, environmental information and the like into a trained beam adjustment model, to obtain beam information having an optimized (preferably, maximum) beam adjustment time interval. Then, in step ST4, the serving base station may adjust the transmission power thereof based on the determined beam information and in conjunction with the measured communication performance (e.g., SINR) of the user equipment.

Figure 10B:
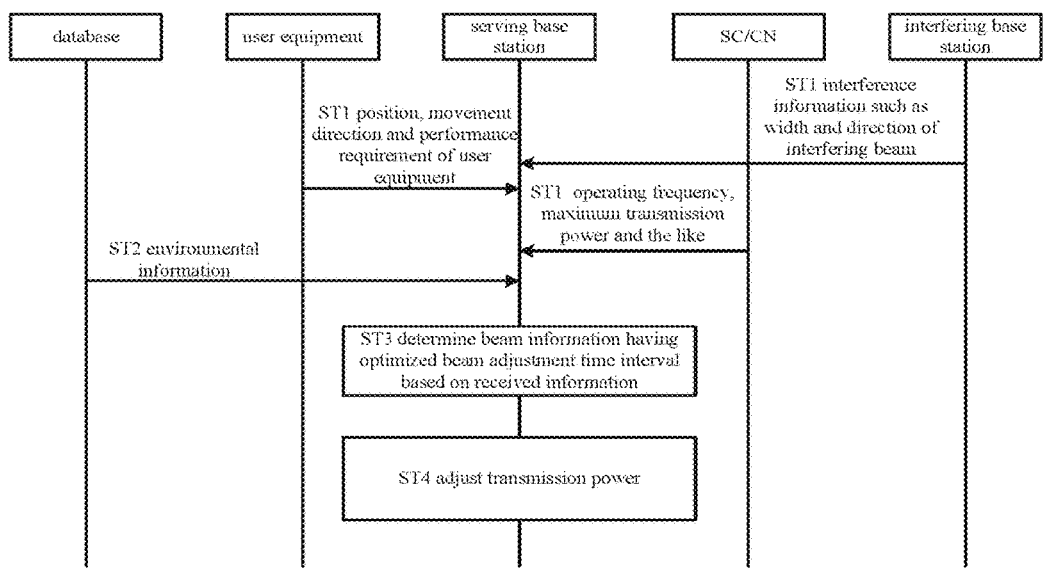

FIG. 10B is a flowchart showing another example of an information interaction process for implementing an adaptive beamforming scheme according to an embodiment of the present disclosure.

The information interaction process shown in FIG. 10B is substantially the same as the information interaction process shown in FIG. 10A, except that there is a backhaul connection between base stations, thus the interfering base station may directly report the relevant interference information to the serving base station, instead of via the core network CN or the spectrum coordinator SC. The other processes may be referred to the description for FIG. 10A and are not repeated here anymore.

Figure 10C:
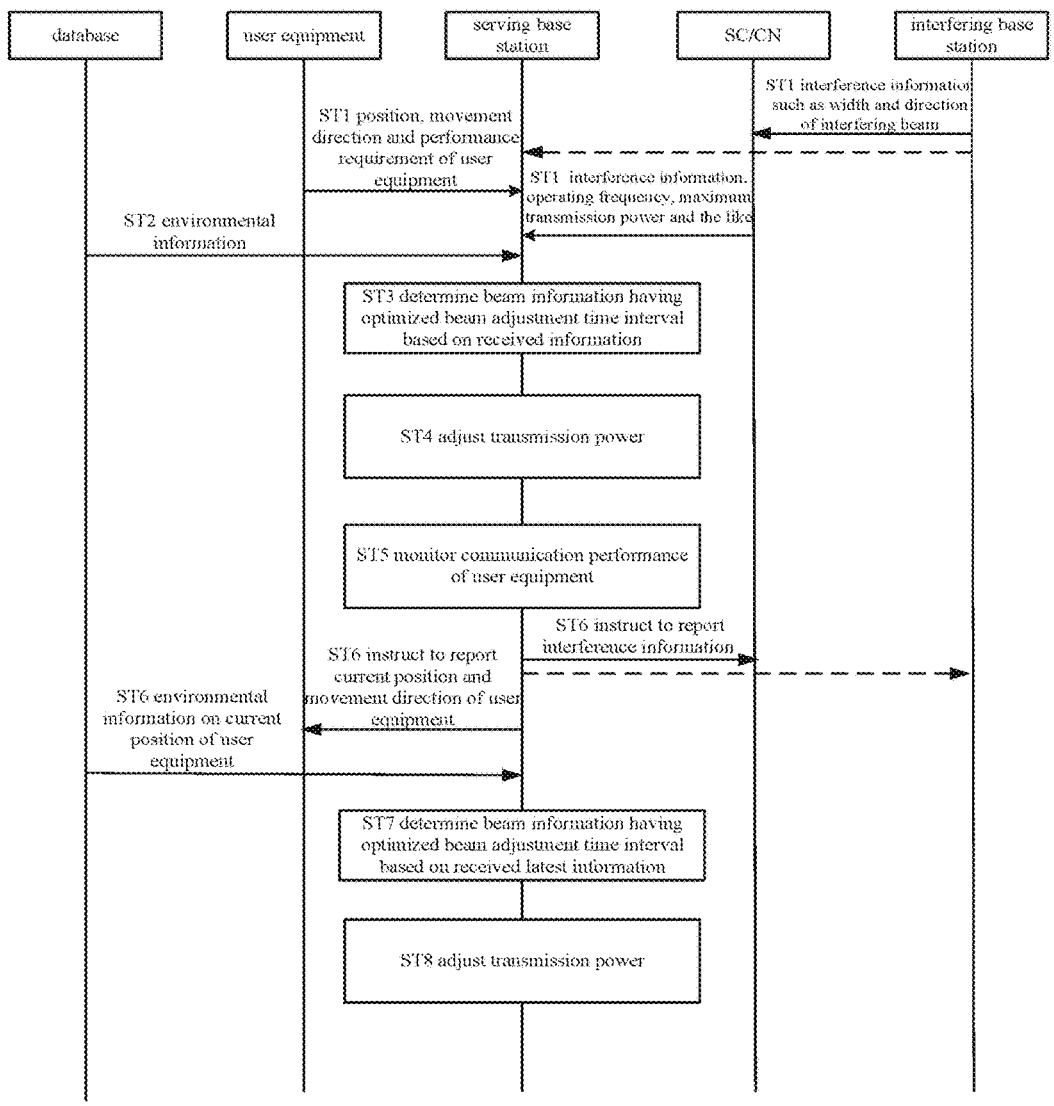

FIG. 10C is a flowchart showing yet another example of an information interaction process for implementing an adaptive beamforming scheme according to an embodiment of the present disclosure.

FIG. 10C shows an information interaction process of a processing example in which real-time adaptive beamforming is achieved by monitoring the communication performance of the user equipment in real time. Compared with the information interaction processes shown in FIGS. 10A and 10B, in the example shown in FIG. 10C, in order to achieve real-time adaptive beam adjustment, in addition to performing the above-described steps ST1 to ST4 at the time of system initialization, it also needs to monitor the communication performance of the user equipment in real time so as to trigger a beam adjustment process based on the monitored communication performance.

Specifically, after the beam information suitable for the current state of the user equipment is initially determined, the serving base station monitors the communication performance of the user equipment in real time in step ST5. In a case where the communication performance is degraded and the performance requirement of the user equipment cannot be met by adjusting the transmission power, in step ST6, the serving base station instructs the user equipment to report a current position and a movement direction thereof, directly or indirectly instructs the interfering base station to report the interference information, and obtains the environmental information at the current position from the database. Then, in step ST7, the serving base station determines, based on the information reported by the user equipment and the interfering base station in response to the instruction from the serving base station, the beam information having a maximum beam adjustment time interval suitable for the current state using the beam adjustment model. Next, in step ST8, the serving base station may adjust the transmission power thereof based on the determined beam information and in conjunction with the measured communication performance (e.g., SINR) of the user equipment. By repeating steps ST5 to ST8, real-time adaptive beam adjustment can be achieved.

It should be understood that the information interaction processes described above with reference to FIGS. 10A to 10C are only exemplary, and those skilled in the art may appropriately modify the information interaction processes according to the principle of the present disclosure. In addition, it should be noted that numbers of the steps described above are only for convenience of description and are not intended to limit an execution order of the steps. In actual implementation, some steps may be executed in parallel, or the order may be changed.

Corresponding to the above-described apparatus embodiments, the following method embodiments are further provided in the present disclosure.

Figure 11:
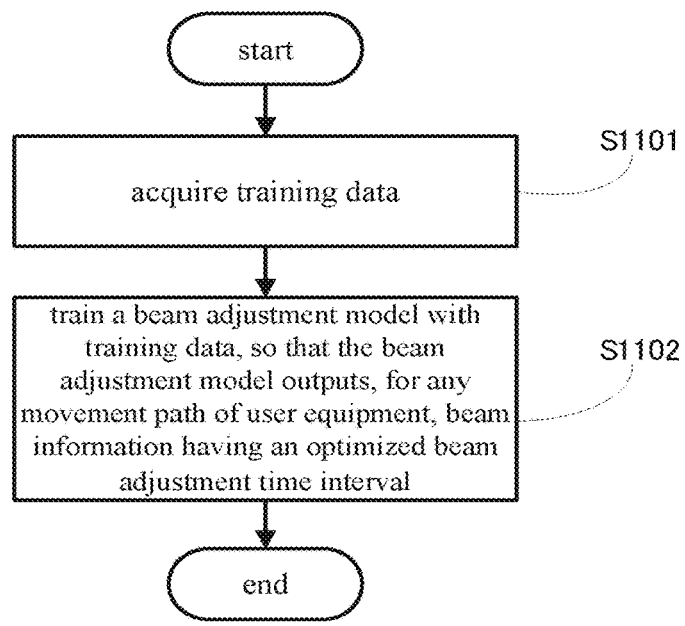
FIG. 11 is a flowchart showing an example of a processing flow of a method on a base station side in a wireless communication system according to an embodiment of the present disclosure.

5. Method on a Base Station Side in a Wireless Communication System According to an Embodiment of the Present Disclosure FIG. 11 is a flowchart showing an example of a processing flow of a method on a base station side in a wireless communication system according to an embodiment of the present disclosure. The method is performed to train a beam adjustment model for achieving adaptive beamforming.

As shown in FIG. 11, the method according to the embodiment starts at step S1101. In step S1101, a serving base station acquires training data. The training data includes training paths constituted by at least different initial positions and movement directions of the user equipment as an input parameter of the beam adjustment model, and beam information which enables a beam adjustment time interval meeting a performance requirement of the user equipment to be optimized as an output parameter of the beam adjustment model. The training data may be predetermined externally or may be generated by the serving base station in the manner described above with reference to FIGS. 3 to 5, which is not described repeatedly here anymore.

Then, the method proceeds to step S1102. In step S1102, the beam adjustment model is trained with the training data, so that the beam adjustment model outputs, for any movement path of the user equipment, the beam information that enables the beam adjustment time interval meeting the performance requirement of the user equipment to be optimized.

Preferably, the beam information output by the beam adjustment model is beam information that enables the beam adjustment time interval meeting the performance requirement of the user equipment to be maximized.

In addition, preferably, the input parameter of the beam adjustment model may further include environmental information (e.g., street information, building information and the like), interference information (e.g., a width and a direction of an interfering beam, and the like) and the like.

It should be noted that the method embodiment described herein corresponds to the apparatus embodiment described above with reference to FIGS. 2 to 6, thus the contents which are not described in detail here can be referred to the above description at the corresponding positions, and are not repeated here.

Figure 12:
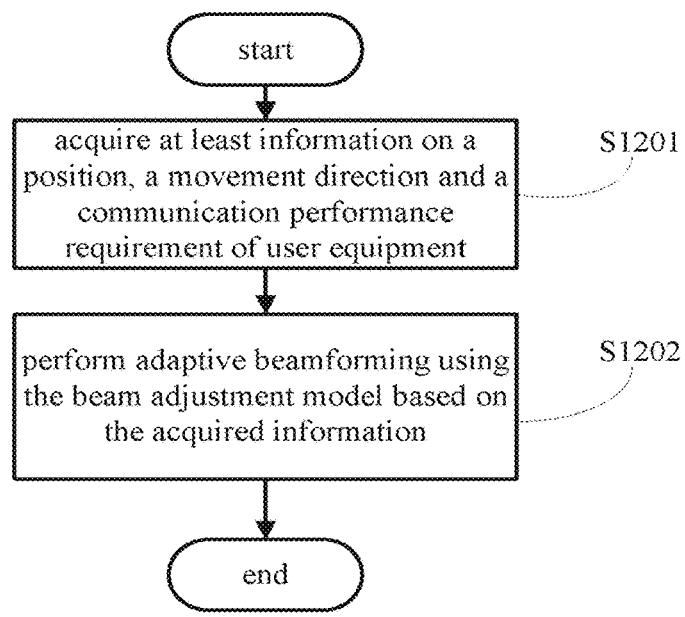
FIG. 12 is a flowchart showing an example of a processing flow of a method on a base station side in a wireless communication system according to an embodiment of the present disclosure.

FIG. 12 is a flowchart showing an example of a processing flow of a method on a base station side in a wireless communication system according to an embodiment of the present disclosure. The method is performed to achieve adaptive beamforming using a trained beam adjustment model.

As shown in FIG. 12, the method according to the embodiment starts at step S1201. In step S1201, the serving base station acquires at least information on a position, a movement direction and a communication performance requirement of the user equipment. Preferably, in step S1201, environmental information such as street information, interference information such as the width and the direction of an interfering beam, system information such as an operating frequency and a maximum transmission power and the like are further acquired.

Then, the method proceeds to step S1202. In step S1202, the serving base station inputs the information acquired in step S1201 to a beam adjustment model trained in advance, for performing beam adjustment, so as to obtain beam information which has an optimized (preferably, maximum) beam adjustment time interval and is suitable for a current state of the user equipment, thereby achieving adaptive beamforming.

Preferably, the method further includes steps of: monitoring communication performance of the user equipment; instructing the user equipment to report a current position and a movement direction of the user equipment, and optionally, directly or indirectly instructing an interfering base station to report interference information, in a case of monitoring that the communication performance of the user equipment does not meet a communication performance requirement; and performing, based on the current position and the movement direction reported by the user equipment and optionally the interference information, beam adjustment using the beam adjustment model. In this way, real-time adaptive beamforming can be achieved.

Preferably, the method further includes: adjusting transmission power of the serving base station of the user equipment based on the monitored communication performance of the user equipment. Further preferably, the transmission power may be preferentially adjusted to ensure the communication performance of the user equipment meets the performance requirement of the user equipment, and if the communication performance requirement of the user equipment cannot be met by adjusting the transmission power, beam adjustment is performed using the beam adjustment model by further acquiring relevant information, thereby further reducing the system overhead, and the relevant measurement and processing overhead.

Also, it should be noted that the method embodiment described herein corresponds to the apparatus embodiment described above with reference to FIGS. 7 to 8, and therefore the contents which are not described in detail herein can be referred to the above description at the corresponding positions, and are not repeated here.

6. Method on a User Equipment Side in a Wireless Communication System According to an Embodiment of the Present Disclosure FIG. 13 is a flowchart showing an example of a processing flow of a method on a user equipment side in a wireless communication system according to an embodiment of the present disclosure.

Figure 13:
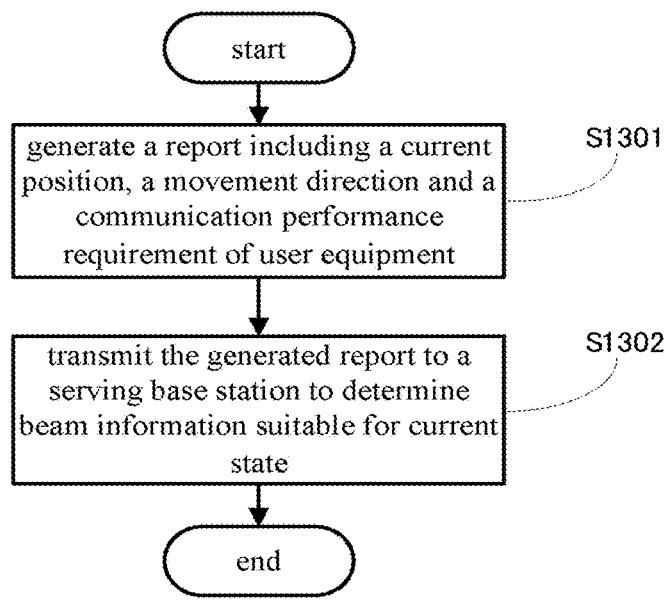
FIG. 13 is a flowchart showing an example of a processing flow of a method on a user equipment side in a wireless communication system according to an embodiment of the present disclosure.

As shown in FIG. 13, the method according to the present embodiment starts at step S1301. In step S1301, the user equipment generates a report including a current position, a movement direction and a communication performance requirement thereof.

Then, the method proceeds to step S1302. In step S1302, the user equipment transmits the generated report to a serving base station thereof, so that the serving base station performs beam adjustment using a beam adjustment model based on the report to achieve adaptive beamforming.

Preferably, the user equipment may generate, based on an instruction transmitted by the serving base station in the case where the communication performance of the user equipment does not meet the communication performance requirement, the report including the current position and the movement direction to be transmitted to the serving base station.

Also, it should be noted that the method embodiment described herein corresponds to the apparatus embodiment described above with reference to FIG. 9, and thus the contents which are not described in detail here may be referred to the above description at the corresponding positions, and are not repeated here.

In addition, it should be noted that although the method embodiments according to the present disclosure are described above with reference to the flowcharts shown in FIGS. 11 to 13, these are merely exemplary rather than restrictive. Those skilled in the art may modify the illustrated examples of the processing flows according to the principle of the present disclosure. For example, steps in various embodiments may be added, deleted, modified, combined or the like, and all of such modifications are considered to fall within the scope of the present disclosure It should be understood that machine-executable instructions in a storage medium and a program product according to the embodiments of the present disclosure may be also configured to execute the methods corresponding to the apparatus embodiments described above, thus contents which are not described in detail may be referred to foregoing description at corresponding positions, which are not described repeatedly here anymore.

Accordingly, a storage medium on which the above program product storing machine executable instructions is carried is also included in the disclosure. The storage medium includes but not limited to a floppy disk, an optical disk, a magneto-optical disk, a storage card, a memory rod and the like.

7. Technical Effect of the Present Disclosure and Simulation

According to the embodiments of the present disclosure described above, by performing the beam adjustment using the beam adjustment model trained with the beam adjustment time interval as an optimization target according to the technology of the present disclosure, at least one or more of the following technical effects can be achieved:

(1) by enabling the beam adjustment time interval meeting the performance requirement of the user equipment to be optimized, system overhead, and measurement and processing overhead can be reduced while ensuring communication performance of the user equipment;

(2) beam adjustment can be performed more intelligently and accurately by fully utilizing data information from various sources, including but not limited to information on a user equipment, system information, interference information, environmental information, etc.;

(3) real-time measurement and processing overhead can be further reduced by using the beam adjustment model to quickly determine beam information having an optimized beam adjustment time interval; and (4) adaption to beamforming in a communication scenario where a channel condition changes rapidly (e.g., a mobile user equipment in a dense small-cell network in millimeter-wave band) may be better.

In order to further illustrate that the system overhead can be significantly reduced with the technology of the present disclosure, reduction in the processing overhead of the beam adjustment scheme according to the technology of the present disclosure as compared with the existing technical solution is described below through simulation with a fast beam adjustment scheme in the conventional technology as an comparison example.

The operating principle of the fast beam adjustment scheme includes: performing beam sweeping if it is detected that communication performance of the user equipment cannot meet a performance requirement thereof; stopping the beam sweeping once a beam meeting the performance requirement of the user equipment is swept; and switching to operate on the beam. The beam adjustment scheme according to the present disclosure adopts for example the beam adjustment model obtained through the training simulation described above with reference to FIG. 4.

Figure 14:
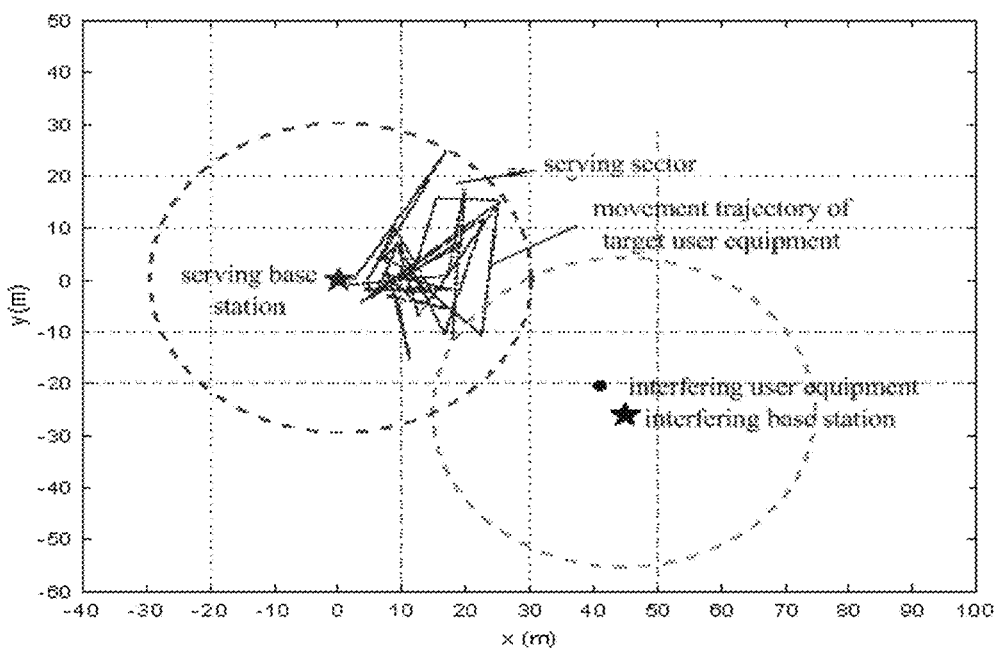
FIG. 14 is a schematic diagram showing a simulation example of a movement trajectory of a user equipment according to an embodiment of the present disclosure.

In the simulation, a movement trajectory of the user equipment can be generated using a random walking model. Specifically, an initial position is selected randomly within the coverage area of the serving cell, then an ending point is selected randomly within the coverage area, and the user equipment moves to the ending point at a certain speed. The operations described above are repeated $N_m$ times. In this simulation, $N_m$ is set to be 100, that is, the user equipment moves totally 100 times, and the generated movement trajectory is as shown in FIG. 14.

Part of relevant parameters used during the simulation are shown in Table 2 below.

TABLE 2

| Simulation parameter | |
|---|---|
| Parameter | Value |
| Operating frequency, f | 28 GHz |
| Maximum transmission power of serving base station | 30 dBm |
| Transmission power of interfering base station | 5 dBm |
| Noise index | 5 dB |
| Thermal noise | −174 dBm |
| Bandwidth, B | 10 MHz |
| SINR requirement of user equipment | 20 dB |
| Cell radius, R | 30 m |
| Number of transmission antennas on base station side | 16 |

TABLE 2-continued

| Simulation parameter | |
|---|---|
| Parameter | Value |
| Number of reception antennas on user equipment side | 1 |
| Movement speed of user equipment, V | 0.5 m/s |
| Angle range of motion | [−60°, +60°] |
| Angle interval | 1° |
| Distance interval | 1 m |
| Number of testing positions | 2791 | where path loss is calculated using a path loss model in the 28 GHz millimeter-wave band, as shown in the following equation (4):

$$PL = \alpha + 10\beta \log_{10}(d) + \xi \ [\text{dB}] \quad (4)$$

under the LOS condition, $\alpha=61.4$, $\beta=2.0$, and d represents a distance between a transmitter and a receiver, that is, a path length, with a unit of meter, while under the NLOS condition, d may represent a distance of a beam transmission path.

Based on the above simulation settings, in a case that one interfering beam is considered for example, comparison of processing overhead between the beam adjustment scheme according to the present disclosure and the fast beam adjustment scheme in the conventional technology is shown in Table 3 below.

TABLE 3

| Comparison of processing overhead | | | |
|---|---|---|---|
| | The number of times of beam adjustment | Average beam adjustment time interval (s) | Reduction in processing overhead |
| Beam adjustment scheme according to the present disclosure | 266 | 10.37 | 34.32% |
| Fast beam adjustment scheme in the conventional technology | 405 | 6.89 | |

As shown in Table 3, in a case where the user equipment moves 1395.5 m along the movement trajectory shown in FIG. 14, the number of times of the beam adjustment performed with the beam adjustment scheme according to the present disclosure is only 266, and the number of times of the beam adjustment performed with the comparison scheme is 405. As can be seen, with the beam adjustment scheme according to the present disclosure, a time interval between two times of beam adjustment can be greatly increased, thereby significantly reducing the number of times of the beam adjustment, and further reducing the system overhead, and the measurement and processing overhead.

Figure 15A:
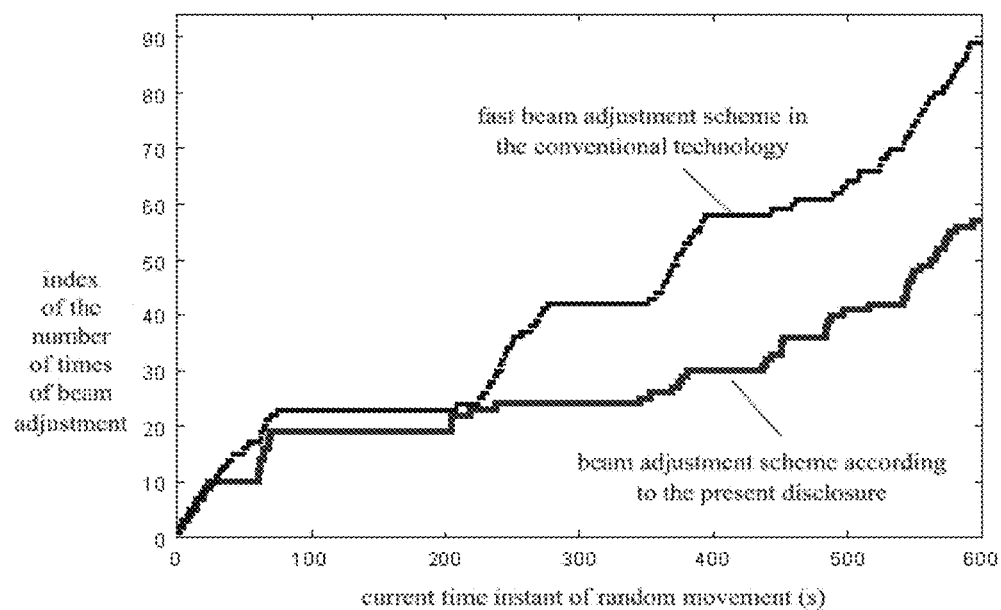
FIG. 15A to FIG. 15C are schematic diagrams respectively showing comparison of the number of times of beam adjustment, comparison of communication performance and comparison of beam selection between the beam adjustment scheme according to the present disclosure and a fast beam adjustment scheme in the conventional technology.
Figure 15B:
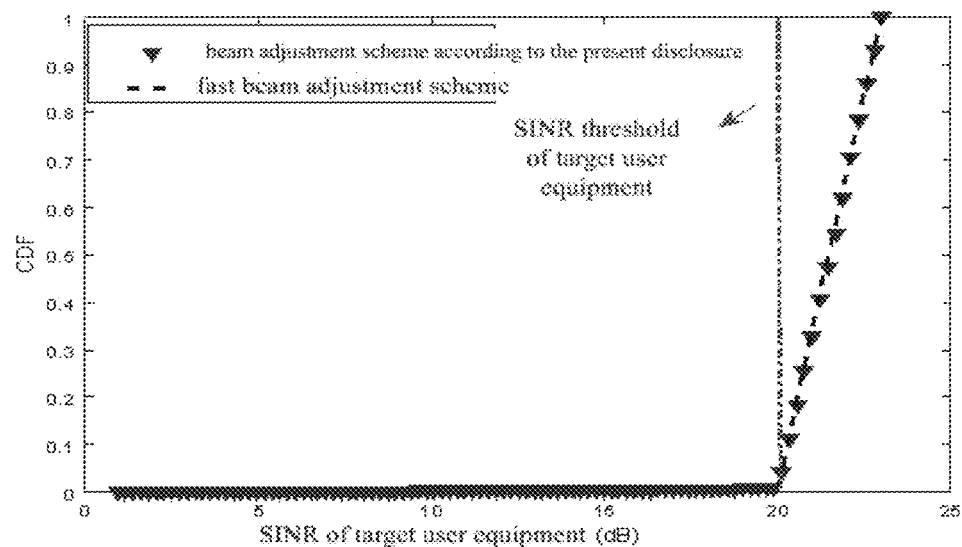
Figure 15C:
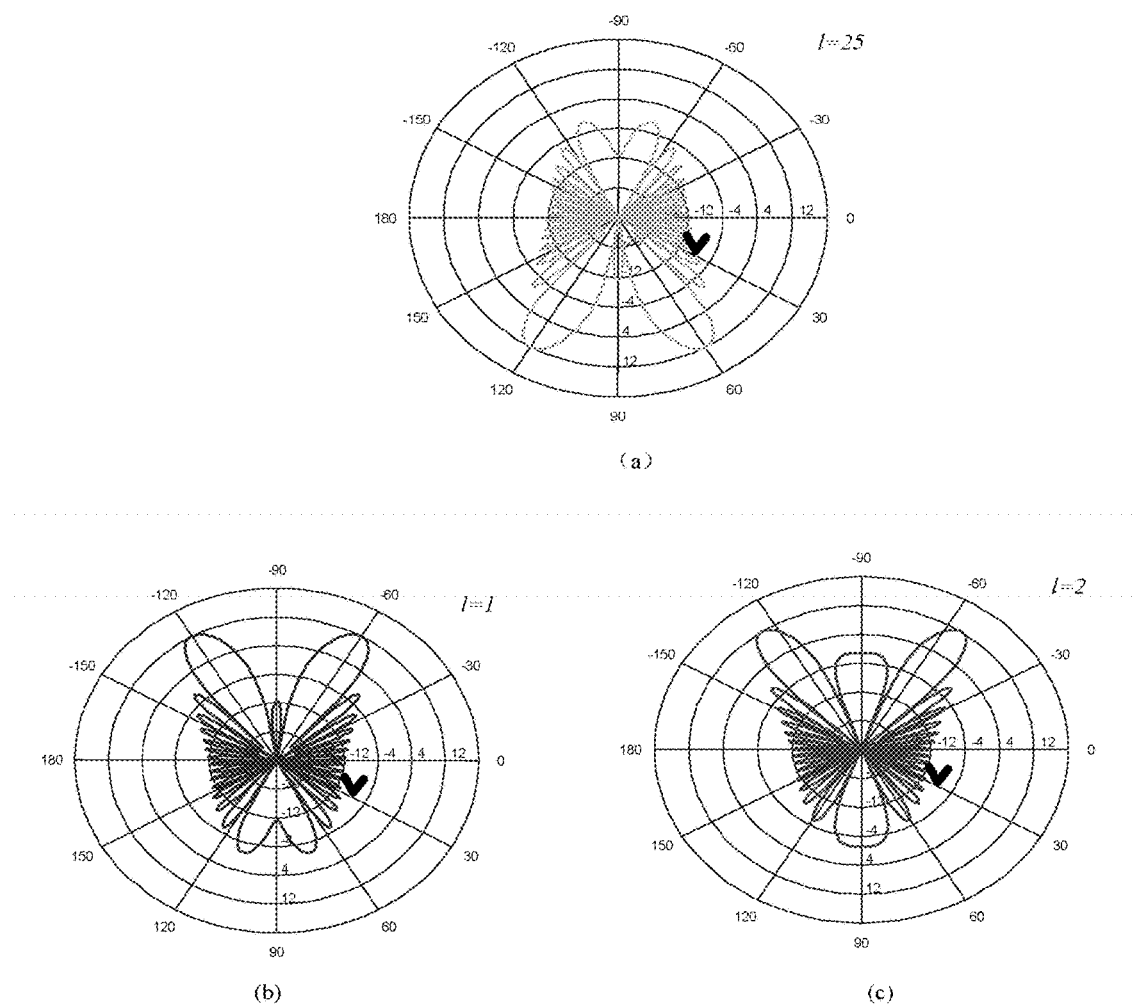
Figure 16:
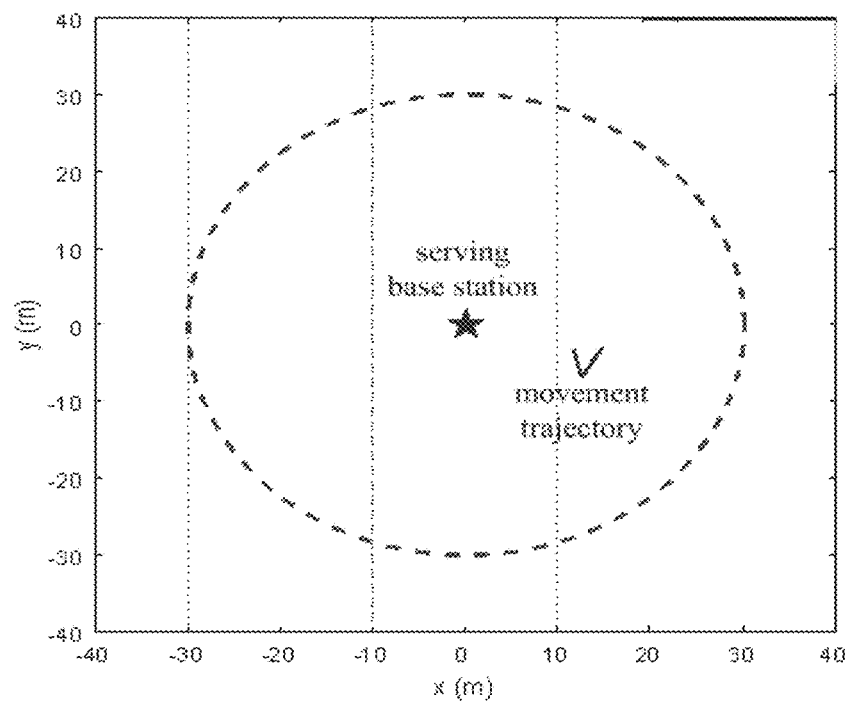
FIG. 16 is a schematic diagram showing a segment of the movement trajectory shown in FIG. 14.

FIG. 15A, FIG. 15B, and FIG. 15C are schematic diagrams respectively showing comparison of the number of times of beam adjustment, comparison of communication performance and comparison of beam selection between the two schemes described above.

As shown in FIG. 15A, first 50 times of beam adjustment performed by the two beam adjustment schemes are selected for illustration, an x-axis represents the number of times of adjustment and a y-axis represents a current time instant of random movement. It can be seen that at the same time instant, i.e. for the same movement trajectory, the number of times of the beam adjustment in the beam adjustment scheme according to the present disclosure is much smaller than that in the comparison scheme. That is, the beam adjustment scheme according to the present disclosure can increase the beam adjustment time interval and reduce the number of times of beam adjustment, thereby reducing the system overhead.

As shown in FIG. 15B, an SINR performance of the user equipment is taken as an example for comparison, an x-axis represents an SINR of the user equipment and a y-axis represents a cumulative probability distribution. It can be seen that the SINR performance of the user equipment obtained by the two beam adjustment schemes are substantially coincident with each other. That is, compared with the beam adjustment scheme in the conventional technology, the beam adjustment scheme according to the present disclosure can significantly reduce the system overhead without degrading the performance of the user equipment.

It can be found through the simulation statistic that the beam adjustment scheme according to the present disclosure can meet the SINR requirement of the user equipment at 98.82% of positions within the serving cell, and thus the outage probability can be ignored. That is, since the beam adjustment scheme according to the present disclosure can intelligently and quickly determine beam information suitable for the current state, the user equipment can be avoided from being in a low communication performance state for a long time, thereby further improving service quality of the user equipment to a certain extent, and improving user experience.

In FIG. 15C, to further facilitate explanation, any segment of movement trajectory selected from the movement trajectories shown in FIG. 14 is taken as an example (for the sake of clarity, FIG. 16 separately shows the segment of movement trajectory), and an array gain pattern of a beam selected by the beam adjustment scheme according to the present disclosure and an array gain pattern of a beam selected by the fast beam adjustment scheme in the conventional technology are drawn for the segment of movement trajectory. In addition, for the sake of facilitating understanding, the segment of movement trajectory is drawn in the corresponding array gain patterns.

(a) in FIG. 15C shows an array gain pattern of the beam selected by the beam adjustment scheme according to the present disclosure. A beam index selected by the beam adjustment scheme according to the present disclosure is 25 for this segment of movement trajectory, and this beam can maintain the communication performance of the user equipment always meets the performance requirement thereof on the segment of movement trajectory, with a beam adjustment time interval of 23 s. (b) and (c) in FIG. 15C show array gain patterns of beams selected by the beam adjustment scheme according to the conventional technology. A selected beam index is 1 in (b), and a selected beam index is 2 in (c). On this segment of movement trajectory, 7 times of beam adjustment are performed in the beam adjustment scheme according to the conventional technology, and the selected beam indexes are [1, 2, 1, 2, 1, 2, 1] respectively, that is, switching is repeatedly performed between the beam having the beam index 1 and the beam having the beam index 2, and the corresponding beam adjustment time intervals are 3 s, 2 s, 5 s, 2 s, 2 s and 2 s, respectively. It can be seen that the beam adjustment scheme according to the present disclosure greatly increases the beam adjustment time interval and reduces the number of times of beam adjustment, thereby greatly reducing the system overhead.

In conclusion, it can be seen from the comparisons shown in FIGS. 15A to 15C that compared with the beam adjustment scheme according to the conventional technology, the beam adjustment model is trained by taking the beam adjustment time interval as an optimization target, and the beam adjustment model obtained through the training is applied to perform real-time adaptive beam adjustment, thereby greatly reducing the system overhead, and measurement and processing overhead and improving a system response speed, without degrading the communication performance of the user equipment.

8. Computing Apparatus for Implementing an Electronic Apparatus and a Method According to the Present Disclosure Furthermore, it shall be noted that the foregoing series of processes and apparatuses can also be embodied in software and/or firmware. In the case of being embodied in software and/or firmware, a program constituting the software is installed from a storage medium or a network to a computer with a dedicated hardware structure, e.g., a general purpose personal computer 1700 illustrated in FIG. 17, which can perform various functions when various programs are installed thereon.

Figure 17:
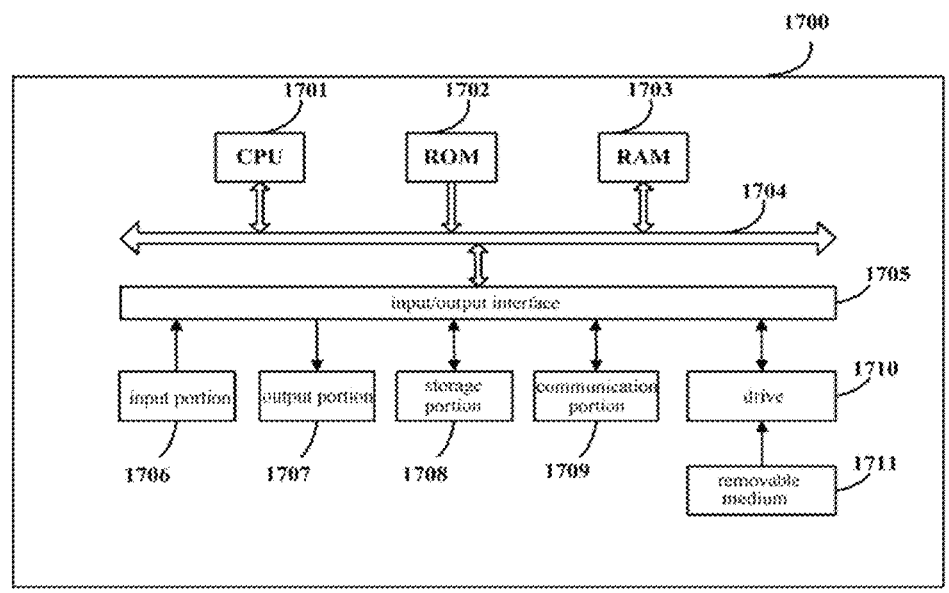
FIG. 17 is a block diagram showing an exemplary configuration of a personal computer as an information processing apparatus applicable in an embodiment of the present disclosure.

In FIG. 17, a Central Processing Unit (CPU) 1701 performs various processes according to a program stored in a Read Only Memory (ROM) 1702 or loaded from a storage portion 1708 into a Random Access Memory (RAM) 1703 in which data required when the CPU 1701 performs the various processes is also stored as needed.

The CPU 1701, the ROM 1702 and the RAM 1703 are connected to each other via a bus 1704 to which an input/output interface 1705 is also connected.

The following components are connected to the input/output interface 1705: an input portion 1706 including a keyboard, a mouse, etc.; an output portion 1707 including a display, e.g., a Cathode Ray Tube (CRT), a Liquid Crystal Display (LCD), etc., a speaker, etc.; a storage portion 1708 including a hard disk, etc.; and a communication portion 1709 including a network interface card, e.g., an LAN card, a modem, etc. The communication portion 1709 performs a communication process over a network, e.g., the Internet.

A drive 1710 is also connected to the input/output interface 1705 as needed. A removable medium 1711, e.g., a magnetic disk, an optical disk, an magneto optical disk, a semiconductor memory, etc., can be installed on the drive 1710 as needed so that a computer program fetched therefrom can be installed into the storage portion 1708 as needed.

In the case that the foregoing series of processes are performed in software, a program constituting the software is installed from a network, e.g., the Internet, etc., or a storage medium, e.g., the removable medium 1711, etc.

Those skilled in the art shall appreciate that such a storage medium will not be limited to the removable medium 1711 illustrated in FIG. 17 in which the program is stored and which is distributed separately from the apparatus to provide a user with the program. Examples of the removable medium 1711 include a magnetic disk (including a Floppy Disk (a registered trademark)), an optical disk (including Compact Disk-Read Only memory (CD-ROM) and a Digital Versatile Disk (DVD)), a magneto optical disk (including a Mini Disk (MD) (a registered trademark)) and a semiconductor memory. Alternatively the storage medium can be the ROM 1702, a hard disk included in the storage portion 1708, etc., in which the program is stored and which is distributed together with the apparatus including the same to the user.

9. Application Example of the Technology According to the Present Disclosure The technology of the present disclosure can be applied to various products including a base station and a user equipment. Specifically, a base station may be realized as any type of evolved Node B (eNB) such as a macro eNB and a small eNB. The small eNB may be an eNB such as a pico eNB, a micro eNB and a home (femto) eNB that covers a cell smaller than a macro cell. Instead, the base station may be realized as any other types of base stations such as a NodeB and a base transceiver station (BTS). The base station may include a main body (that is also referred to as a base station apparatus) configured to control radio communication, and one or more remote radio heads (RRH) disposed in a different place from the main body. In addition, various types of terminals described below may each operate as the base station by temporarily or semi-persistently executing a base station function.

The user equipment may be realized as a mobile terminal (such as a smartphone, a tablet personal computer (PC), a notebook PC, a portable game terminal, a portable/dongle type mobile router, and a digital camera), or an in-vehicle terminal (such as a car navigation apparatus). The user equipment may also be realized as a terminal (that is also referred to as a machine type communication (MTC) terminal) that performs machine-to-machine (M2M) communication. Furthermore, the user equipment may be a radio communication module (such as an integrated circuit module including a single die) mounted on each of the terminals.

Application examples according to the present disclosure are described below with reference to FIGS. 18 to 21.

9-1. Application Example Regarding Base Station

First Application Example

Figure 18:
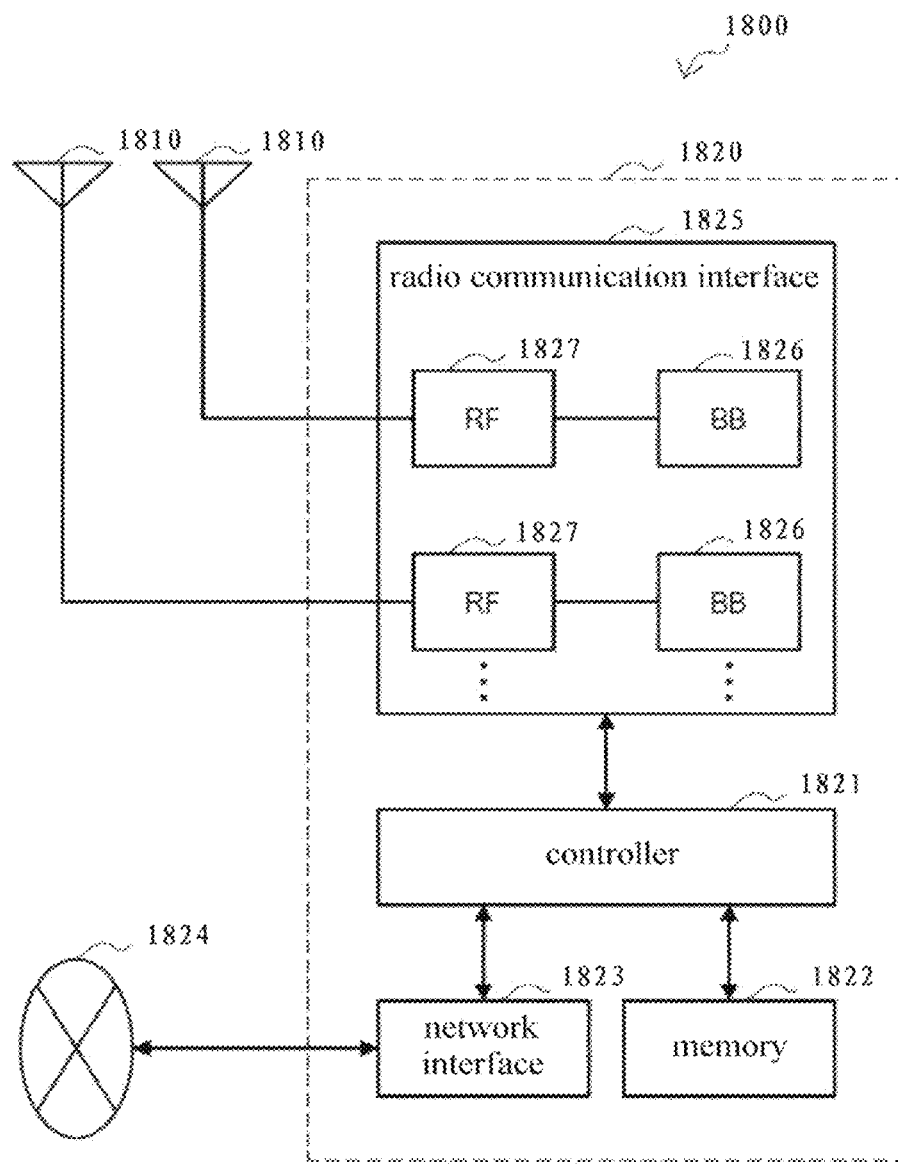
FIG. 18 is a block diagram showing a first example of a schematic configuration of an evolved node (eNB) to which the technology of the present disclosure may be applied.

FIG. 18 is a block diagram showing a first example of a schematic configuration of an eNB to which the technology of the present disclosure may be applied. The eNB 1800 includes one or more antennas 1810 and a base station apparatus 1820. The base station apparatus 1820 and each of the antennas 1810 may be connected to each other via an RF cable.

Each of the antennas 1810 includes a single or multiple antenna elements (such as multiple antenna elements included in a multiple-input multiple-output (MIMO) antenna), and is used for the base station apparatus 1820 to transmit and receive radio signals. As shown in FIG. 18, the eNB 1800 may include multiple antennas 1810. For example, multiple antennas 1810 may be compatible with multiple frequency bands used by the eNB 1800. Although FIG. 18 illustrates an example in which the eNB 1800 includes multiple antennas 1810, the eNB 1800 may also include a single antenna 1810.

The base station apparatus 1820 includes a controller 1821, a memory 1822, a network interface 1823, and a radio communication interface 1825.

The controller 1821 may be, for example, a CPU or a DSP, and operates various functions of a higher layer of the base station apparatus 1820. For example, the controller 1821 generates a data packet from data in signals processed by the radio communication interface 1825 and transfer the generated packet via the network interface 1823. The controller 1821 may bundle data from multiple baseband processors to generate bundled packets and transfer the generated bundled packet. The controller 1821 may have logical functions of performing control such as radio resource control, radio bearer control, mobility management, admission control, and scheduling. The control may be performed in cooperation with an eNB or a core network node in the vicinity. The memory 1822 includes a RAM and a ROM, and stores the program executed by the controller 1821 and various types of control data (such as a terminal list, transmission power data, and scheduling data).

The network interface 1823 is a communication interface for connecting the base station apparatus 1820 to the core network 1824. The controller 1821 may communicate with the core network node or other eNB via the network interface 1823. In this case, the eNB 1800 may be connected to the core network node or other eNB through a logical interface (such as an S1 interface and an X2 interface). The network interface 1823 may also be a wired communication interface or a radio communication interface for radio backhaul. If the network interface 1823 is a radio communication interface, the network interface 1823 may use a higher frequency band than the frequency band used by the radio communication interface 1825 for radio communication.

The radio communication interface 1825 supports any cellular communication scheme (such as Long Term Evolution (LTE) and LTE-Advanced), and provides radio connection to a terminal located in a cell of the eNB 1800 via the antenna 1810. The radio communication interface 1825 may typically include, for example, a baseband (BB) processor 1826 and an RF circuit 1827. The BB processor 1826 may perform, for example, encoding/decoding, modulating/demodulating, and multiplexing/demultiplexing, and performs various types of signal processing of layers (e.g., L1, medium access control (MAC), radio link control (RLC) and a packet data convergence protocol (PDCP)). Instead of the controller 1821, the BB processor 1826 may have a part or all of the logical functions described above. The BB processor 1826 may be a memory for storing a communication control program or a module including a processor and a related circuit configured to execute a program. Updating the program may allow the functions of the BB processor 1826 to be changed. The module may be a card or a blade inserted into a slot of the base station apparatus 1820. Alternatively, the module may also be a chip mounted on a card or a blade. Meanwhile, the RF circuit 1827 may include, for example, a mixer, a filter, and an amplifier, and transmit and receive radio signals via the antenna 1810.

As shown in FIG. 18, the radio communication interface 1825 may include multiple BB processors 1826. For example, multiple BB processors 1826 may be compatible with multiple frequency bands used by the eNB 1800. As shown in FIG. 18, the radio communication interface 1825 may include multiple RF circuits 1827. For example, the multiple RF circuits 1827 may be compatible with multiple antenna elements. Although FIG. 18 illustrates an example that the radio communication interface 1825 includes multiple BB processors 1826 and multiple RF circuits 1827, the radio communication interface 1825 may also include a single BB processor 1826 or a single RF circuit 1827.

Second Application Example

Figure 19:
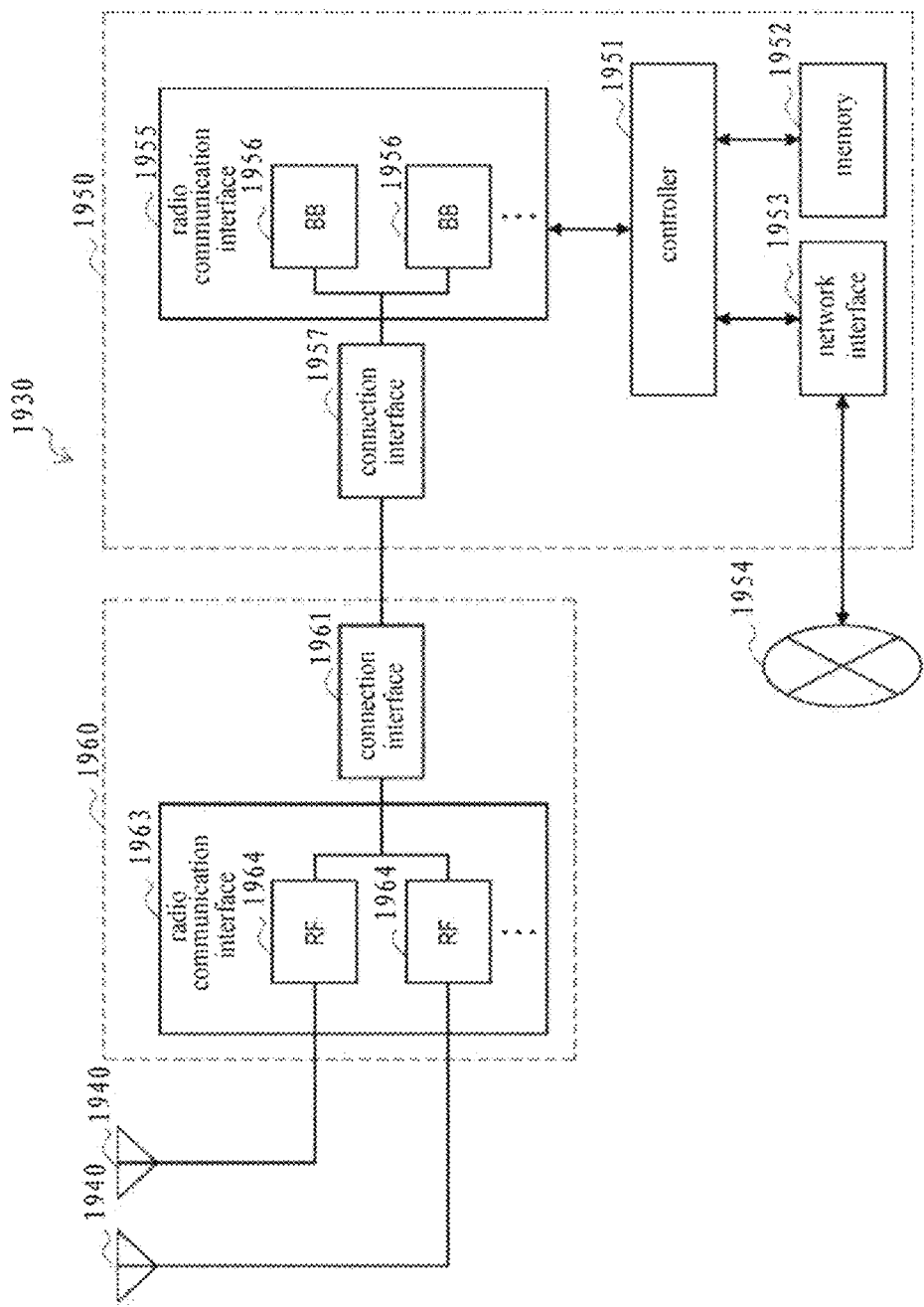
FIG. 19 is a block diagram showing a second example of a schematic configuration of an eNB to which the technology of the present disclosure may be applied.

FIG. 19 is a block diagram illustrating a second example of a schematic configuration of an eNB to which the technology of the present disclosure may be applied. The eNB 1930 includes one or more antennas 1940, a base station apparatus 1950 and a RRH 1960. The RRH 1960 and each of the antennas 1940 may be connected to each other via an RF cable. The base station apparatus 1950 and the RRH 1960 may be connected to each other via a high speed line such as an optical fiber cable.

Each of the antennas 1940 includes a single or multiple antenna elements (such as multiple antenna elements included in the MIMO antenna), and is used for the RRH 1960 to transmit and receive radio signals. As shown in FIG. 19, the eNB 1930 may include multiple antennas 1940. For example, the multiple antennas 1940 may be compatible with multiple frequency bands used by the eNB 1930. Although FIG. 19 illustrates an example in which the eNB 1930 includes multiple antennas 1940, the eNB 1930 may also include a single antenna 1940.

The base station apparatus 1950 includes a controller 1951, a memory 1952, a network interface 1953, a radio communication interface 1955, and a connection interface 1957. The controller 1951, the memory 1952, and the network interface 1953 are the same as the controller 1821, the memory 1822, and the network interface 1823 described with reference to FIG. 18.

The radio communication interface 1955 supports any cellular communication scheme (such as LTE and LTE-Advanced) and provides radio communication to a terminal located in a sector corresponding to the RRH 1960 via the RRH 1960 and the antenna 1940. The radio communication interface 1955 may typically include, for example, a BB processor 1956. The BB processor 1956 is the same as the BB processor 1826 described with reference to FIG. 18 except that the BB processor 1956 is connected to the RF circuit 1964 of the RRH 1960 via the connection interface 1957. As shown in FIG. 19, the radio communication interface 1955 may include multiple BB processors 1956. For example, the multiple BB processors 1956 may be compatible with multiple frequency bands used by the eNB 1930. Although FIG. 19 illustrates an example in which the radio communication interface 1955 includes multiple BB processors 1956, the radio communication interface 1955 may also include a single BB processor 1956.

The connection interface 1957 is an interface for connecting the base station apparatus 1950 (the radio communication interface 1955) to the RRH 1960. The connection interface 1957 may also be a communication module for communication in the above-described high-speed line for connecting the base station apparatus 1950 (the radio communication interface 1955) to the RRH 1960.

The RRH 1960 includes a connection interface 1961 and a radio communication interface 1963.

The connection interface 1961 is an interface for connecting the RRH 1960 (the radio communication interface 1963) to the base station apparatus 1950. The connection interface 1961 may also be a communication module for communication in the above-described high-speed line.

The radio communication interface 1963 transmits and receives a radio signal via the antenna 1940. The radio communication interface 1963 may typically include, for example, an RF circuit 1964. The RF circuit 1964 may include, for example, a mixer, a filter, and an amplifier, and transmits and receives a radio signal via the antenna 1940. As shown in FIG. 19, the radio communication interface 1963 may include multiple RF circuits 1964. For example, the multiple RF circuits 1964 may support multiple antenna elements. Although FIG. 19 illustrates an example in which the radio communication interface 1963 includes multiple RF circuits 1964, the radio communication interface 1963 may also include a single RF circuit 1964.

In the eNB 1800 shown in FIG. 18 and the eNB 1930 shown in FIG. 19, the communication unit in the above-described electronic apparatus 700 may be implemented by the radio communication interface 1825 and the radio communication interface 1955 and/or the radio communication interface 1963. At least part of the functions of the acquiring unit and the training unit in the electronic apparatus 200 and the acquiring unit and the adjusting unit in the electronic apparatus 700 may also be realized by the controller 1821 and the controller 1951.

9-2. Application Example Regarding User Equipment

First Application Example

Figure 20:
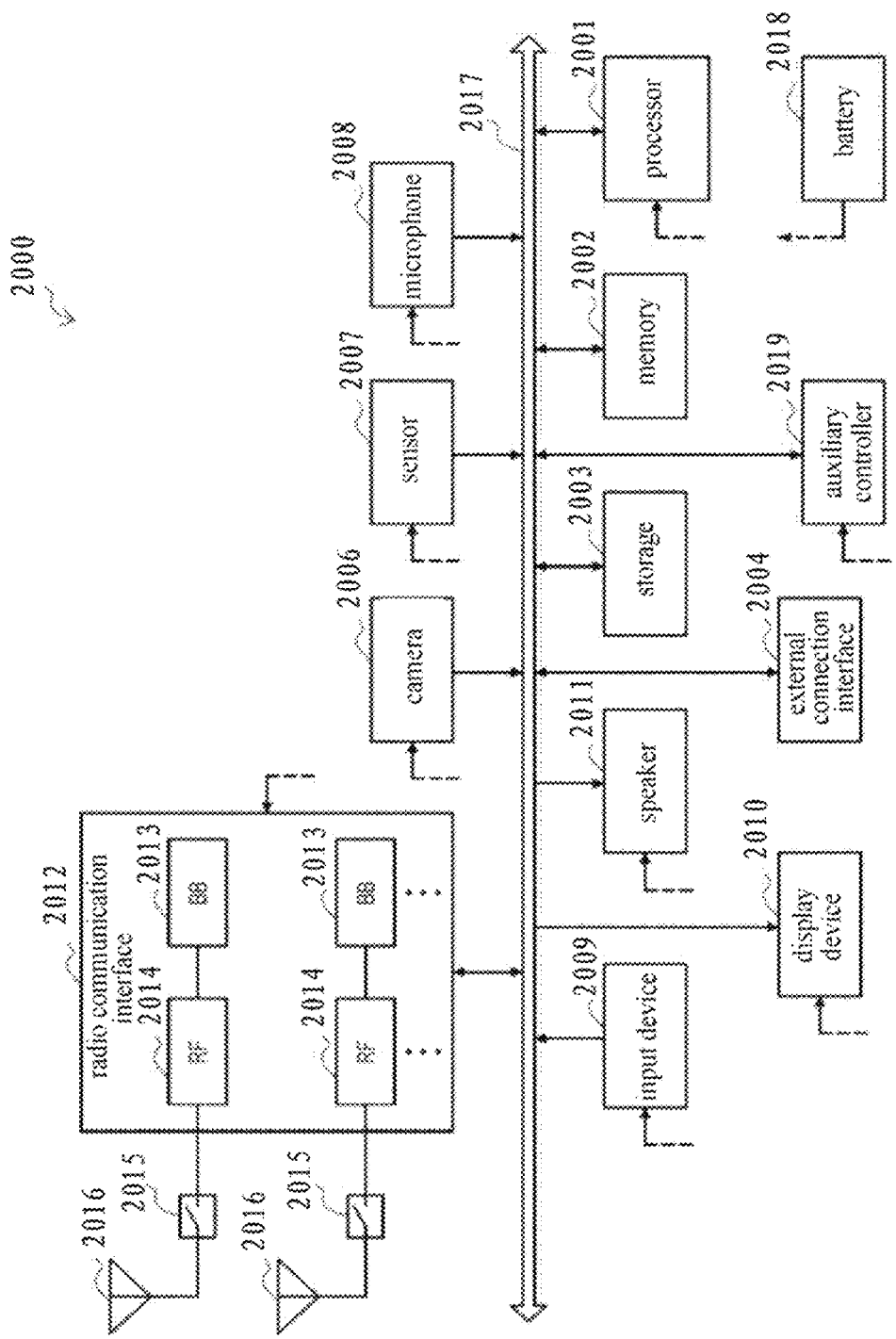
FIG. 20 is a block diagram showing an example of a schematic configuration of a smartphone to which the technology of the present disclosure may be applied.

FIG. 20 is a block diagram illustrating an example of a schematic configuration of a smartphone 2000 to which the technology of the present disclosure may be applied. The smartphone 2000 includes a processor 2001, a memory 2002, a storage 2003, an external connection interface 2004, a camera 2006, a sensor 2007, a microphone 2008, an input device 2009, a display device 2010, a speaker 2011, a radio communication interface 2012, one or more antenna switches 2015, one or more antennas 2016, a bus 2017, a battery 2018, and an auxiliary controller 2019.

The processor 2001 may be, for example, a CPU or a system-on-chip (SoC), and controls functions of an application layer and other layers of the smartphone 2000. The memory 2002 includes a RAM and a ROM, and stores programs executed by the processor 2001 and data. The storage 2003 may include a storage medium, such as a semiconductor memory and a hard disk. The external connection interface 2004 is an interface for connecting an external device (such as a memory card and a universal serial bus (USB) device) to the smartphone 2000.

The camera 2006 includes an image sensor (such as a charge coupled device (CCD) and a complementary metal oxide semiconductor (CMOS)), and generates a captured image. The sensor 2007 may include a set of sensors, such as a measurement sensor, a gyro sensor, a geomagnetic sensor, and an acceleration sensor. The microphone 2008 converts the sound input to the smartphone 2000 into an audio signal. The input device 2009 includes, for example, a touch sensor configured to detect touch on a screen of the display device 2010, a keypad, a keyboard, a button or a switch, and receives an operation or information input from the user. The display device 2010 includes a screen (such as a liquid crystal display (LCD) and an organic light emitting diode (OLED) display), and displays an output image of the smartphone 2000. The speaker 2011 converts the audio signals output from the smartphone 2000 to sounds.

The radio communication interface 2012 supports any cellular communication scheme (such as LTE and LTE-advanced), and performs radio communication. The radio communication interface 2012 may generally include, for example, a BB processor 2013 and a RF circuit 2014. The BB processor 2013 may perform, for example, encoding/decoding, modulating/demodulating, and multiplexing/demultiplexing, and perform various types of signal processing for radio communication. The RF circuit 2014 may include, for example, a mixer, a filter, and an amplifier, and transmits and receives wireless signals via the antenna 2016. The radio communication interface 2012 may be a chip module on which the BB processor 2013 and the RF circuit 2014 are integrated. As shown in FIG. 20, the radio communication interface 2012 may include multiple BB processors 2013 and multiple RF circuits 2014. Although FIG. 20 illustrates an example in which the radio communication interface 2012 includes multiple BB processors 2013 and multiple RF circuits 2014, the radio communication interface 2012 may also include a single BB processor 2013 or a single RF circuit 2014.

In addition to the cellular communication scheme, the radio communication interface 2012 may also support another type of radio communication scheme such as a device-to-device (D2D) communication scheme, a short-distance wireless communication scheme, a near field communication scheme, and a wireless local area network (LAN) scheme. In this case, the radio communication interface 2012 may include a BB processor 2013 and an RF circuit 2014 for each radio communication scheme.

Each of the antenna switches 2015 switches connection destinations of the antenna 2016 among multiple circuits (such as circuits for different radio communication schemes) included in the radio communication interface 2012.

Each of the antennas 2016 includes a single or multiple antenna elements (such as multiple antenna elements included in a MIMO antenna), and is used for the radio communication interface 2012 to transmit and receive radio signals. As shown in FIG. 20, the smartphone 2000 may include multiple antennas 2016. Although FIG. 20 illustrates an example in which the smartphone 2000 includes multiple antennas 2016, the smartphone 2000 may also include a single antenna 2016.

In addition, the smartphone 2000 may include an antenna 2016 for each radio communication scheme. In this case, the antenna switches 2015 may be omitted from the configuration of the smartphone 2000.

The bus 2017 connects the processor 2001, the memory 2002, the storage 2003, the external connection interface 2004, the camera 2006, the sensor 2007, the microphone 2008, the input device 2009, the display device 2010, the speaker 2011, the radio communication interface 2012, and the auxiliary controller 2019 with each other. The battery 2018 supplies power to the blocks of the smartphone 2000 shown in FIG. 20 via feeder lines, which are partially shown as dashed lines in FIG. 20. The auxiliary controller 2019 operates a minimum function required of the smartphone 2000, for example, in a sleep mode.

In the smartphone 2000 shown in FIG. 20, the communication unit in the electronic apparatus 900 described above may be implemented by the radio communication interface 2012. At least a part of the functions of the generating unit may also be implemented by the processor 2001 or the auxiliary controller 2019.

Second Application Example

Figure 21:
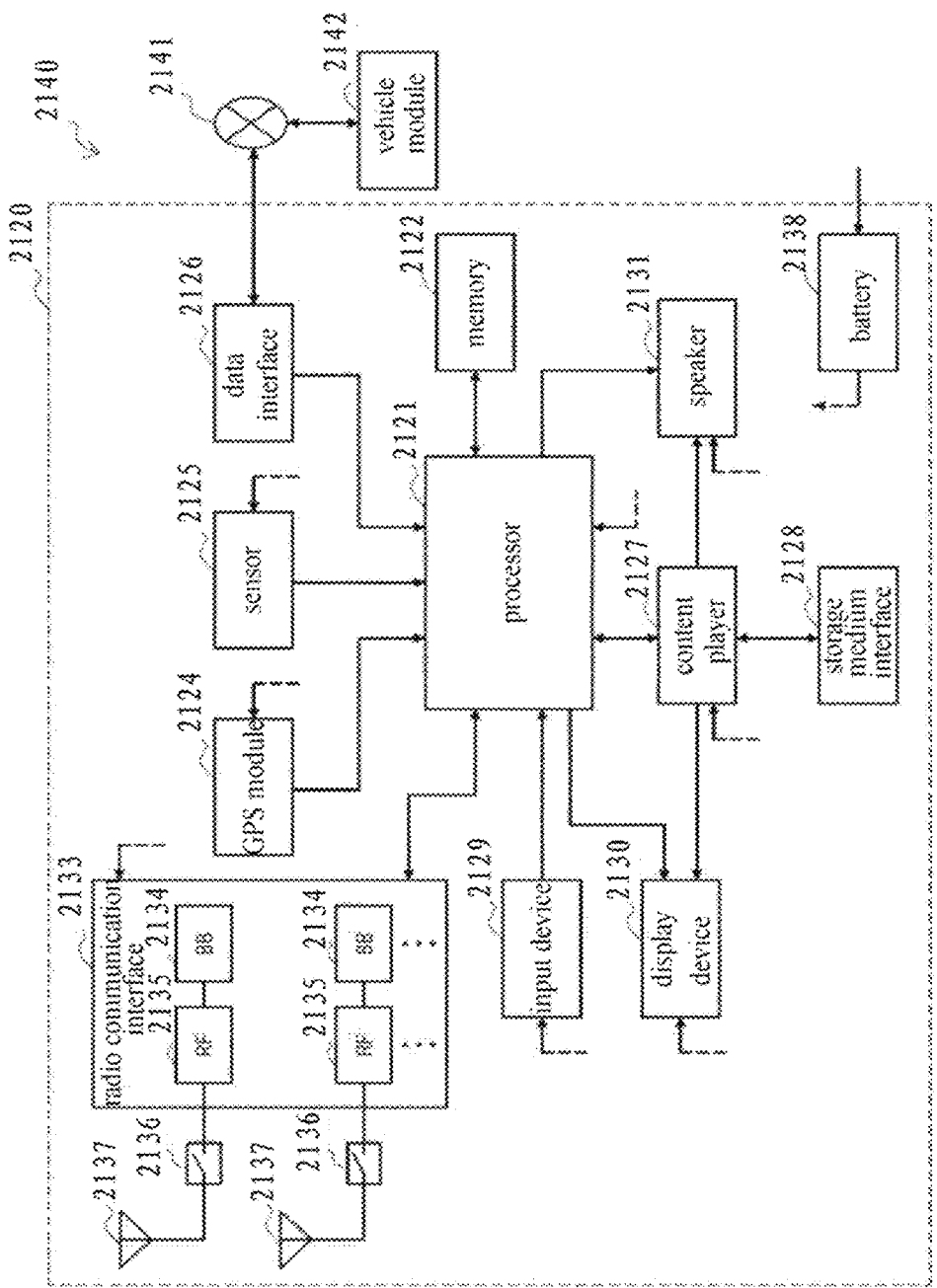
FIG. 21 is a block diagram showing an example of a schematic configuration of a car navigation apparatus to which the technology of the present disclosure may be applied.

FIG. 21 is a block diagram illustrating an example of a schematic configuration of a car navigation apparatus 2120 to which the technology of the present disclosure may be applied. The car navigation apparatus 2120 includes a processor 2121, a memory 2122, a global positioning system (GPS) module 2124, a sensor 2125, a data interface 2126, a content player 2127, a storage medium interface 2128, an input device 2129, a display device 2130, a speaker 2131, a radio communication interface 2133, one or more antenna switches 2136, one or more antennas 2137, and a battery 2138.

The processor 2121 may be, for example, a CPU or a SoC, and controls a navigation function and other functions of the car navigation apparatus 2120. The memory 2122 includes a RAM and a ROM, and stores programs executed by the processor 2121 and data.

The GPS module 2124 measures a position (such as latitude, longitude, and altitude) of the car navigation apparatus 2120 using a GPS signal received from a GPS satellite. The sensor 2125 may include a set of sensors, such as a gyro sensor, a geomagnetic sensor, and an air pressure sensor. The data interface 2126 is connected to, for example, an in-vehicle network 2141 via a terminal not shown, and acquires data generated by the vehicle (such as vehicle speed data).

The content player 2127 reproduces content stored in storage medium (such as a CD and a DVD) that is inserted into the storage medium interface 2128. The input device 2129 includes, for example, a touch sensor configured to detect touch on the screen of the display device 2130, a button or a switch, and receives an operation or information input from the user. The display device 2130 includes a screen such as an LCD display or an OLED display, and displays an image of the navigation function or reproduced content. The speaker 2131 outputs the sound of the navigation function or the reproduced content.

The radio communication interface 2133 supports any cellular communication scheme (such as LTE and LTE-advanced), and performs radio communication. The radio communication interface 2133 may typically include, for example, a BB processor 2134 and a RF circuit 2135. The BB processor 2134 may perform, for example, encoding/decoding, modulating/demodulating, and multiplexing/demultiplexing, and perform various types of signal processing for radio communication. The RF circuit 2135 may include, for example, a mixer, a filter, and an amplifier, and transmits and receives radio signals via the antenna 2137. The radio communication interface 2133 may also be a one chip module on which the BB processor 2134 and the RF circuit 2135 are integrated. As shown in FIG. 21, the radio communication interface 2133 may include multiple BB processors 2134 and multiple RF circuits 2135. Although FIG. 21 shows an example in which the radio communication interface 2133 includes multiple BB processors 2134 and multiple RF circuits 2135, the radio communication interface 2133 may also include a single BB processor 2134 or a single RF circuit 2135.

In addition to the cellular communication scheme, the radio communication interface 2133 may also support another type of radio communication schemes such as a device-to-device (D2D) communication scheme, a short-distance wireless communication scheme, a near field communication scheme, and a wireless LAN scheme. In this case, the radio communication interface 2133 may include a BB processor 2134 and a RF circuit 2135 for each radio communication scheme.

Each of the antenna switches 2136 switches connection destinations of the antenna 2137 among multiple circuits (such as circuits for different radio communication schemes) included in the radio communication interface 2133.

Each of the antennas 2137 includes a single or multiple antenna elements (such as multiple antenna elements included in the MIMO antenna), and is used for the radio communication interface 2133 to transmit and receive a radio signal. As shown in FIG. 21, the car navigation apparatus 2120 may include multiple antennas 2137. Although FIG. 21 shows an example in which the car navigation apparatus 2120 includes multiple antennas 2137, the car navigation apparatus 2120 may also include a single antenna 2137.

In addition, the car navigation apparatus 2120 may include an antenna 2137 for each radio communication scheme. In this case, the antenna switches 2136 may be omitted from the configuration of the car navigation apparatus 2120.

The battery 2138 supplies power to the blocks of the car navigation apparatus 2120 shown in FIG. 21 via feeder lines that are partially shown as dashed lines in FIG. 21. The battery 2138 accumulates the power supplied from the vehicle.

In the car navigation apparatus 2120 shown in FIG. 21, the communication unit in the electronic apparatus 900 described above may be implemented by the radio communication interface 2133. At least a part of functions of the generating unit may also be implemented by the processor 2121.

The technology of the present disclosure may also be implemented as an in-vehicle system (or a vehicle) 2140 including one or more blocks of the car navigation apparatus 2120, the in-vehicle network 2141 and a vehicle module 2142. The vehicle module 2142 generates vehicle data (such as a vehicle speed, an engine speed, and trouble information), and outputs the generated data to the in-vehicle network 2141.

Preferred embodiments of the disclosure have been described above with reference to the drawings, but the disclosure is not limited to the above examples of course. Those skilled in the art may devise various alternations and modifications within the scope of the appended claims, and it should be understood that these alternations and modifications would naturally fall within the technical scope of the disclosure.

For example, multiple functions included in one unit in the above embodiments may be implemented by separated devices. Alternatively, multiple functions implemented by multiple units in the above embodiments may be implemented by separated devices respectively. Furthermore, one of the above functions may be implemented by multiple units. Without saying, such configuration is included in the technical scope of the disclosure.

In this specification, the steps described in the flow charts include not only processing performed in the sequential order as described chronically, but also processing performed concurrently or separately but not necessarily chronically. Further, even in the steps processed chronically, without saying, the order can be appropriately changed.

Although the disclosure and the advantages thereof have been described in details, it shall be appreciated that various modifications, substitutions and variations can be made without departing from the spirit and scope of the disclosure as defined by the appended claims. Furthermore, the terms "include", "comprise" or any variants thereof in the embodiments of the disclosure are intended to encompass nonexclusive inclusion so that a process, method, article or apparatus including a series of elements includes both those elements and other elements which are not listed explicitly or an element(s) inherent to the process, method, article or apparatus. Without much more limitation, an element being defined by a sentence "include/comprise a(n) . . . " will not exclude presence of an additional identical element(s) in the process, method, article or apparatus including the element.

The invention claimed is:

1. An electronic apparatus in a wireless communication system, wherein the electronic apparatus comprises processing circuitry configured to:

acquire training data;

train a beam adjustment model for adaptive beamforming with the training data, so that the beam adjustment model outputs, for any movement path of a user equipment, beam information which enables a beam adjustment time interval meeting a performance requirement of the user equipment to be optimized, wherein an optimum beam adjustment time interval is a maximum time interval between two beam adjustments while still meeting a service quality requirement of the user equipment for the any movement path of the user equipment during the maximum time interval.

2. The electronic apparatus according to claim 1, wherein the training data is predetermined and comprises: training paths as an input parameter of the beam adjustment model, comprising at least different initial positions and movement directions of the user equipment; and beam information as an output parameter of the beam adjustment model, which enables the beam adjustment time interval meeting the performance requirement of the user equipment to be optimized.

3. The electronic apparatus according to claim 1, wherein the processing circuitry is further configured to generate the training data by:

generating training paths comprising different initial positions and movement directions of the user equipment within a coverage area of a serving cell of the user equipment as an input parameter of the beam adjustment model;

building a beam database in a codebook-based beamforming manner or an iteration-based non-codebook beamforming manner;

searching, for the input parameter, the beam database for the beam information which enables the beam adjustment time interval meeting the performance requirement of the user equipment to be optimized as an output parameter of the beam adjustment model; and generating the training data based on the input parameter and the output parameter.

4. The electronic apparatus according to claim 3, wherein the codebook comprises a beamsteering codebook and a phase shift-specific codebook, and wherein the codebook is selected to enable all beams within the coverage area of the serving cell to be covered.

5. The electronic apparatus according to claim 3, wherein in a case that the beam database is built in the codebook-based beamforming manner, the beam information is a beamforming weight vector index which enables the beam adjustment time interval meeting the performance requirement of the user equipment to be optimized.

6. The electronic apparatus according to claim 3, wherein in a case that the beam database is built in the iteration-based non-codebook beamforming manner, the beam database is built so that a beam which enables the beam adjustment time interval meeting the performance requirement of the user equipment to be optimized is found in the beam database for at least each of the training paths.

7. The electronic apparatus according to claim 3, wherein the input parameter further comprises environmental information and/or interference information for the user equipment, and wherein the interference information comprises a direction and a width of an interfering beam.

8. The electronic apparatus according to claim 1, wherein the performance requirement comprises one or more of a signal to interference plus noise ratio, a throughput and an outage probability.

9. An electronic apparatus in a wireless communication system, wherein the electronic apparatus comprises processing circuitry configured to:
perform, based on at least information on a position, a movement direction and a communication performance requirement of a user equipment, beam adjustment using the beam adjustment model trained by the electronic apparatus according to claim 1, to achieve adaptive beamforming.

10. The electronic apparatus according to claim 9, wherein the processing circuitry is further configured to perform beam adjustment further based on one or more of environmental information and interference information.

11. The electronic apparatus according to claim 9, wherein the processing circuitry is further configured to:
monitor communication performance of the user equipment;
instruct, in a case of monitoring that the communication performance of the user equipment does not meet the communication performance requirement, the user equipment to report a current position and a movement direction of the user equipment; and
perform, based on the current position and the movement direction reported by the user equipment, beam adjustment using the beam adjustment model.

12. The electronic apparatus according to claim 11, wherein the processing circuitry is further configured to adjust a transmission power of a serving base station of the user equipment based on the monitored communication performance of the user equipment.

13. The electronic apparatus according to claim 11, wherein the processing circuitry is further configured to:
instruct directly or indirectly an interfering base station to report interference information, in a case of monitoring that the communication performance of the user equipment does not meet the communication performance requirement; and
perform, based on the current position and the movement direction reported by the user equipment and the interference information, beam adjustment using the beam adjustment model.

14. The electronic apparatus according to claim 9, wherein the processing circuitry is further configured to perform beam adjustment further based on information on an operating frequency band and a maximum transmission power of a serving base station of the user equipment from a core network or a spectrum coordinator.

15. The electronic apparatus according to claim 9, wherein the electronic apparatus operates as a serving base station of the user equipment and further comprises:
a communication unit configured to perform a data transceiving operation.

16. An apparatus in a wireless communication system, wherein the apparatus comprises processing circuitry configured to:
generate a report comprising at least a position, a movement direction and a communication performance requirement of a user equipment, the report being to be transmitted to a serving base station of the user equipment, so that the serving base station performs, based on the received report, beam adjustment using the beam adjustment model trained by the electronic apparatus according to claim 1, to achieve adaptive beamforming.

17. The apparatus according to claim 16, wherein the processing circuitry is further configured to generate, based on an instruction transmitted by the serving base station in a case that communication performance of the user equipment does not meet the communication performance requirement, a report about a current position and a movement direction of the user equipment to be transmitted to the serving base station.

18. The apparatus according to claim 16, wherein the apparatus operates as the user equipment and further comprises:
a communication unit configured to perform a data transceiving operation.

* * * * *